(12) United States Patent
Irie et al.

(10) Patent No.: US 11,563,900 B2
(45) Date of Patent: Jan. 24, 2023

(54) IMAGING APPARATUS TO IMPROVE SIGNAL-TO-NOISE RATIO, METHOD OF CONTROLLING THE IMAGING APPARATUS, AND NON-TRANSITORY COMPUTER-READABLE STORAGE MEDIUM

(71) Applicant: CANON KABUSHIKI KAISHA, Tokyo (JP)

(72) Inventors: Daisuke Irie, Tochigi (JP); Hisato Sekine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 17/123,938

(22) Filed: Dec. 16, 2020

(65) Prior Publication Data
US 2021/0176407 A1    Jun. 10, 2021

Related U.S. Application Data

(63) Continuation of application No. PCT/JP2019/022851, filed on Jun. 10, 2019.

(30) Foreign Application Priority Data

Jun. 19, 2018 (JP) .............................. JP2018-115919
Apr. 15, 2019 (JP) .............................. JP2019-077034

(51) Int. Cl.
*H04N 5/243* (2006.01)
*H04N 5/235* (2006.01)
*G06T 5/40* (2006.01)

(52) U.S. Cl.
CPC .............. *H04N 5/243* (2013.01); *G06T 5/40* (2013.01); *H04N 5/2351* (2013.01); *G06T 2207/30168* (2013.01)

(58) Field of Classification Search
CPC ........ H04N 5/243; H04N 5/2351; G06T 5/40; G06T 2207/30168
See application file for complete search history.

(56) References Cited

U.S. PATENT DOCUMENTS 9,137,455 B1 * 9/2015 Rivard .................. H04N 5/243
2010/0177225 A1  7/2010 Cieslinski
(Continued)

FOREIGN PATENT DOCUMENTS

| JP | H06-070222 A | 3/1994 |
| JP | 2013-236362 A | 11/2013 |
| JP | 2016-129397 A | 7/2016 |

OTHER PUBLICATIONS

I. Takayanagi; "An 87dB Single Exposure Dynamic Range CMOS Image Sensor with a 3.0 μm Triple Conversion Gain Pixel;" Brillnics Japan Inc.; Jun. 21, 2012 Minami-Oi, Shinagawa-ku, Tokyo, 140-0013, Japan; pp. 274-277.

*Primary Examiner* — Gevell V Selby
(74) *Attorney, Agent, or Firm* — Canon U.S.A., Inc. IP Division

(57) ABSTRACT

An imaging apparatus amplifies signal voltage resulting from voltage conversion of signal charge obtained by photoelectric conversion of an optical image of an object and then performs digital conversion to the signal voltage. The imaging apparatus includes an amplifier circuit that amplifies the signal voltage using two or more amplification factors that are set, a weight determining unit configured to determine weights for the respective signals subjected to the digital conversion after the amplification based on the two or more amplification factors, and a combining unit configured to combine the two or more signals subjected to the digital conversion after the amplification using the weights.

18 Claims, 14 Drawing Sheets

(56) References Cited

U.S. PATENT DOCUMENTS

| | | | |
|---|---|---|---|
| 2012/0256078 A1* | 10/2012 | Mabuchi | H04N 5/35545 |
| | | | 250/208.1 |
| 2015/0102206 A1* | 4/2015 | Borremans | H04N 5/378 |
| | | | 250/208.1 |
| 2015/0350516 A1* | 12/2015 | Rivard | H04N 5/243 |
| | | | 348/229.1 |
| 2019/0074307 A1* | 3/2019 | Kita | H04N 5/369 |

* cited by examiner

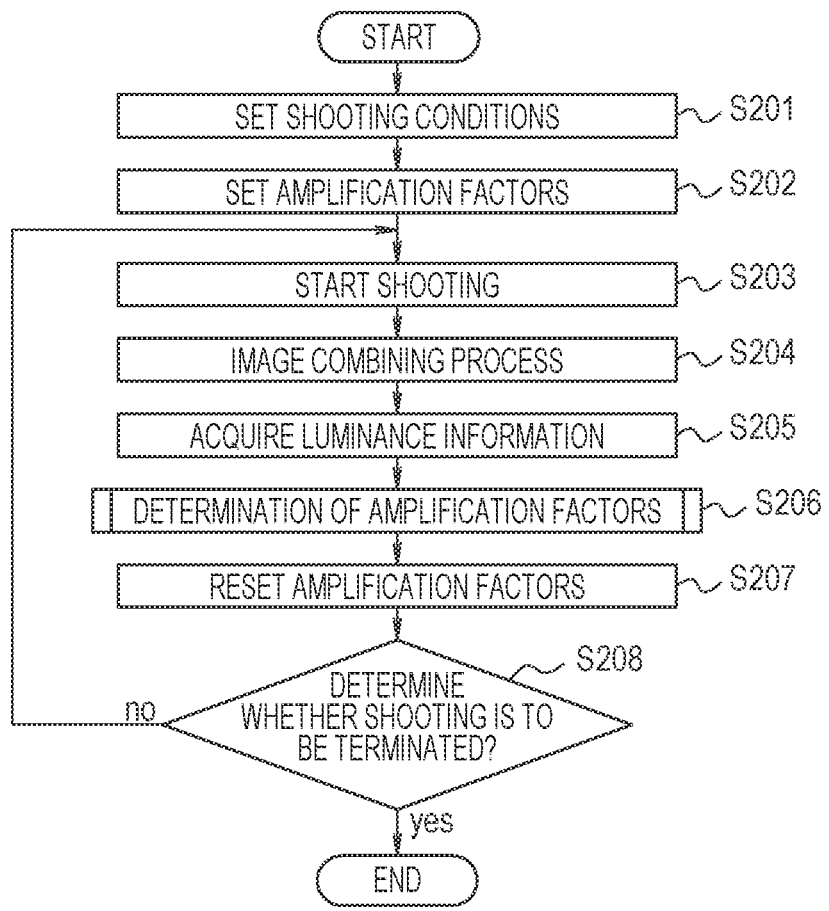
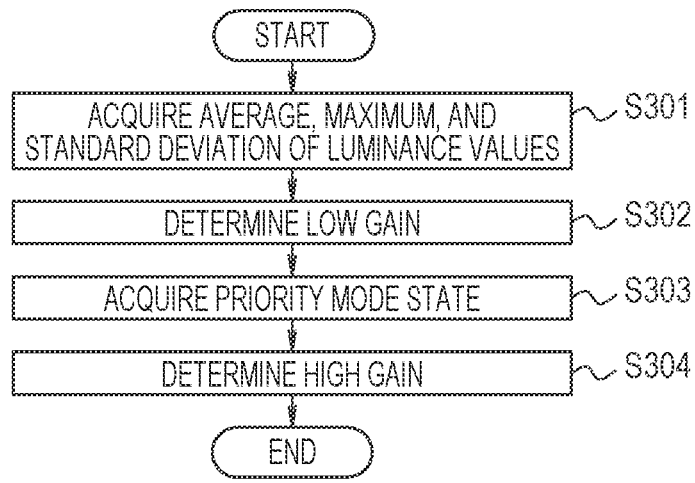

FIG. 6A

COEFFICIENT TABLE : LOW GAIN

KURTOSIS HIGH ↑

| 1/2 | 1 | 1 | 2 |
|-----|---|---|---|
| 1/2 | 1 | 1 | 2 |
| 1/2 | 1 | 1 | 2 |
| 1/2 | 1 | 1 | 2 |

LOW ← 0 → HIGH SKEWNESS

FIG. 6B

COEFFICIENT TABLE: HIGH GAIN

KURTOSIS HIGH ↑

| 4 | 8 | 16 | 32 |
|---|---|----|----|
| 2 | 4 | 8  | 16 |
| 1 | 2 | 4  | 8  |
| 1 | 1 | 2  | 4  |

LOW ← 0 → HIGH SKEWNESS

IMAGING APPARATUS TO IMPROVE SIGNAL-TO-NOISE RATIO, METHOD OF CONTROLLING THE IMAGING APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP2019/022851, filed Jun. 10, 2019, which claims the benefit of Japanese Patent Application No. 2018-115919, filed Jun. 19, 2018 and Japanese Patent Application No. 2019-077034, filed Apr. 15, 2019, which are hereby incorporated by reference herein in their entirety.

BACKGROUND OF THE INVENTION

Field of the Invention

The present invention relates to a technology to control an imaging apparatus.

Background Art

Improvement of a signal-to-noise ratio (S/N ratio) is important in imaging apparatuses. In a common imaging apparatus, one amplification unit provided for one photoelectric conversion element amplifies an electrical signal occurring in the photoelectric conversion element. In contrast, in order to improve the S/N ratio, an imaging apparatus that amplifies an electrical signal occurring in the photoelectric conversion element with two amplification unit is known (refer to PTL1, PTL2, and NON-PTL1). In such an imaging apparatus, the S/N ratio is capable of being improved by performing appropriate selection of the two amplified electrical signals or digital values resulting from analog-to-digital (AD) conversion of the two amplified electrical signals based on the luminance to generate one image.

However, an amplification factor for the electrical signal is determined in advance before shooting in related arts (PTL1, PTL2, and NON-PTL1). Accordingly, when regions or the likes having different brightnesses depending on shooting scenes are rapidly varied, for example, as in outdoor shooting, use of the amplification factor that is set in advance causes a problem in that an effect of improving the S/N ratio is not sufficiently achieved.

CITATION LIST

Patent Literature

PTL1: Japanese Patent Laid-Open No. 2016-129397
PTL2: US-2010-0177225

Non Patent Literature

NON-PTL1: An 87 dB Single Exposure Dynamic Range CMOS Image Sensor with a 3.0 μm Triple Conversion Gain Pixel

SUMMARY OF THE INVENTION

Accordingly, it is an object of the present invention to achieve the sufficient effect of improving the S/N ratio.

According to the first aspect of the present invention, there is provided an imaging apparatus that amplifies signal voltage resulting from voltage conversion of signal charge obtained by photoelectric conversion of an optical image of an object and then performs digital conversion to the signal voltage, comprising:

an amplifier circuit that amplifies the signal voltage using two or more amplification factors;

a weight determining unit configured to determine weights for the respective signals subjected to the digital conversion after the amplification based on the two or more different amplification factors in the amplifier circuit; and a combining unit configured to combine the two or more signals subjected to the digital conversion after the amplification using the weights.

According to the second aspect of the present invention, there is provided a method of controlling an imaging apparatus that amplifies signal voltage resulting from voltage conversion of signal charge obtained by photoelectric conversion of an optical image of an object and then performs digital conversion to the signal voltage, comprising:

amplifying the signal voltage using two or more amplification factors;

determining weights for the respective signals subjected to the digital conversion after the amplification based on the two or more amplification factors; and combining the two or more signals subjected to the digital conversion after the amplification using the weights.

According to the third aspect of the present invention, there is provided a non-transitory computer-readable storage medium for storing a program causing a computer to perform a method of controlling an imaging apparatus that amplifies signal voltage resulting from voltage conversion of signal charge obtained by photoelectric conversion of an optical image of an object and then performs digital conversion to the signal voltage, the program causing the computer to perform:

amplifying the signal voltage using two or more amplification factors;

determining weights for the respective signals subjected to the digital conversion after the amplification based on the two or more amplification factors; and combining the two or more signals subjected to the digital conversion after the amplification using the weights.

Further features of the present invention will become apparent from the following description of exemplary embodiments with reference to the attached drawings.

BRIEF DESCRIPTION OF THE DRAWINGS

FIG. 2 is a flowchart illustrating a processing flow in the imaging apparatus of the first embodiment.
FIG. 3 is a flowchart of a process of determining amplification factors in the first embodiment.
FIG. 6A is table for describing a method of determining the amplification factors in the second embodiment.
FIG. 6B is a table for describing the method of determining the amplification factors in the second embodiment.

DESCRIPTION OF THE EMBODIMENTS

Preferred embodiments of the present invention will herein be described in detail with reference to the drawings. The configurations illustrated in the embodiments described below are only examples and the present invention is not necessarily limited to the illustrated configurations.

First Embodiment

Figure 1:
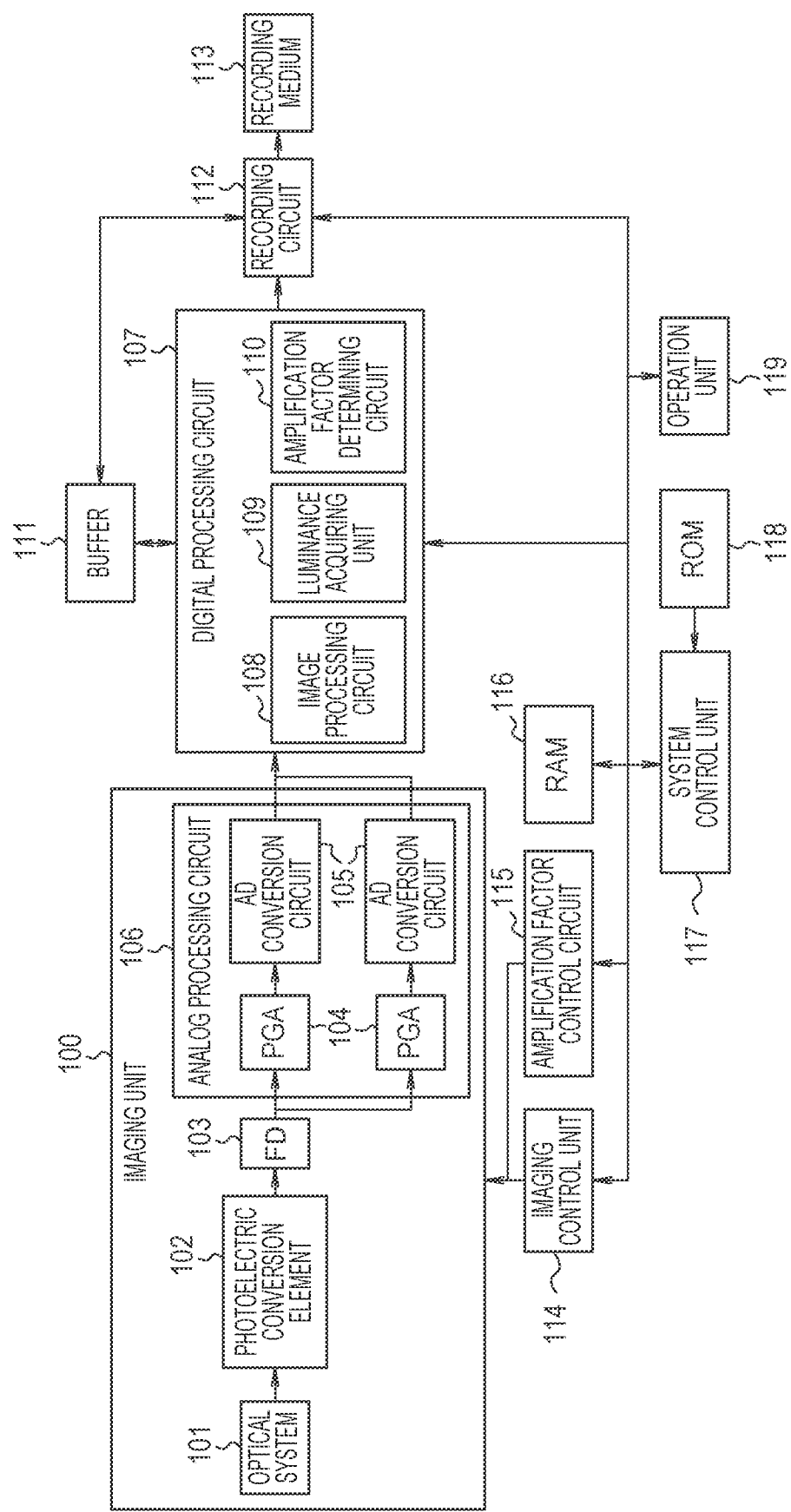
FIG. 1 is a diagram illustrating a configuration of an imaging apparatus of a first embodiment.

FIG. 1 is a diagram schematically illustrating an exemplary configuration of an imaging apparatus of a first embodiment.

An imaging unit 100 includes an optical system 101, a photoelectric conversion element 102, an FD 103, and an analog processing circuit 106 and converts an optical image of an object into image data. The optical system 101 includes a lens and a diaphragm and forms an optical image from the object or the like on the imaging plane of the photoelectric conversion element 102. The photoelectric conversion element 102 captures an optical image of the object or the like and converts the optical image into signal charge through photoelectric conversion. The FD 103 is a floating diffusion amplifier and converts the signal charge output from the photoelectric conversion element 102 into signal voltage through voltage conversion to output the signal voltage. The signal voltage output from the FD 103 is input into the analog processing circuit 106.

The analog processing circuit 106 includes PGAs 104 and AD conversion circuits 105 and performs analog signal processing to the signal voltage supplied from the FD 103. Each of the PGAs 104 is a programmable gain amplifier and is an amplifier circuit that amplifies the signal voltage supplied from the FD 103. The AD conversion circuits 105 each perform analog-to-digital conversion in which the signal voltage amplified in the PGA 104 is converted into a digital value. The PGAs 104 and the AD conversion circuits 105 of at least two lines are provided in the analog processing circuit 106. Images of the two or more lines, which are composed of digital values, are output from the AD conversion circuits 105 of the two or more lines and are supplied to a digital processing circuit 107.

The digital processing circuit 107 includes an image processing circuit 108, a luminance acquiring unit 109, and an amplification factor determining circuit 110 and performs digital signal processing of the captured images. The digital processing circuit 107 will be described in detail below.

A buffer 111 is a data buffer that stores the result of processing in the luminance acquiring unit 109 and data that is being processed in the luminance acquiring unit 109.

A recording medium 113 is, for example, a secure digital (SD) card, a compact flash (CF) card (CompactFlash (registered trademark), or a hard disk drive (HDD), which stores the captured image data.

A recording circuit 112 records the image data subjected to the digital signal processing in the digital processing circuit 107 on the recording medium 113 and reads out the image data from the recording medium 113, if needed.

A system control unit 117 controls the entire imaging apparatus.

A read only memory (ROM) 118 is a non-volatile memory that stores programs used by the system control unit 117 to perform a variety of control described below and control data, such as various control parameters.

A random access memory (RAM) 116 is a volatile memory used by the system control unit 117 to control the imaging apparatus.

An imaging control unit 114 is an imaging operation control unit that controls the operation of the imaging unit 100 in response to a control instruction from the system control unit 117.

An amplification factor control circuit 115 controls an amplification factor of the signal voltage by, for example, varying the setting of electrostatic capacitance of the FD 103 and the settings of the amplification factors of the PGAs 104.

An instruction from the outside (a user or a connection device such as a release button) of the imaging apparatus is input into the imaging apparatus with an operation unit 119.

<Shooting Operation Flow of Imaging Apparatus>

A flow of a shooting operation of a video in the imaging apparatus configured in the above manner will now be described with reference to the configuration diagram illustrated in FIG. 1 and a flowchart illustrated in FIG. 2. The respective processing steps in the flowchart in FIG. 2 are performed by the respective components in the imaging apparatus under the control of the system control unit 117. In the description of the flowchart in FIG. 2, the processing steps S201 to S208 are abbreviated to S201 to S208. The same applies to the other flowcharts described below.

The configuration is exemplified in the present embodiment, in which the analog processing circuit 106 includes the PGAs 104 and the AD conversion circuits 105 of the two lines, as illustrated in FIG. 1. A process of determining the amplification factors based on the average and the standard deviation of pixels is described in the present invention.

In S201 in FIG. 2, the imaging control unit 114 sets shooting conditions (for example, the shutter speed, the aperture, and the International Organization for Standardization (ISO) speed) of the imaging apparatus in response to an instruction externally supplied via the operation unit 119. In the setting of the shooting conditions, the imaging control unit 114 varies the settings of the aperture of the optical system 101 and the exposure time of the photoelectric conversion element 102 in the imaging unit 100.

In S202, the amplification factor control circuit 115 sets the amplification factors of the PGAs 104 and the electrostatic capacitance of the FD 103. This step is preprocessing that is performed only in the first frame of the video. In the setting of the amplification factors and the electrostatic capacitance in S202, the values corresponding to the shooting conditions or setting values stored in the ROM 118 are used.

In S203, the imaging control unit 114 starts the shooting operation of the imaging unit 100 in response to a shooting instruction externally supplied via the operation unit 119. Here, the imaging control unit 114 first drives the lens and the diaphragm in the optical system 101 to form an optical image of the object on the photoelectric conversion element 102 as the shooting operation. The photoelectric conversion element 102 converts the optical image into the signal charge in accordance with the exposure time controlled in response to a control signal from the imaging control unit 114 and supplies the signal charge to the FD 103. The signal charge output from the photoelectric conversion element 102 is converted into the signal voltage in the FD 103 and then the signal voltage is supplied to the analog processing circuit 106 with being distributed into the two paths (the two lines). The signal voltage input into the analog processing circuit 106 is amplified in the PGAs 104 of the two lines and then is converted into the digital values in the AD conversion circuits 105 of the two lines. The digital values are then supplied to the digital processing circuit 107. Since the PGAs 104 and the AD conversion circuits 105 of the two lines are provided in the example in FIG. 1, the images of the two lines, which are composed of the digital values of the two lines from the AD conversion circuits 105, are supplied to the digital processing circuit 107.

In S204, the image processing circuit 108 performs an acquisition process of the images of the two lines output in S203 and an image combining process in which an image resulting from combination of the images of the two lines is output. At this time, the image processing circuit 108 performs the image combining process in which common image processing including digital gain control, white balance control, and gamma correction is performed to the acquired images of the two lines to combine the images of the two lines subjected to the image processing. In the present embodiment, the method of the image combining process is varied depending on the amplification factors set for the images of the two lines to be processed. For example, if the images of the two lines to be processed have different amplification factors, which are set for the FD 103 and the PGAs 104 in the imaging unit 100, the image processing circuit 108 performs a selection process of selectively using pixels having high image qualities in a region where luminance ranges of the images of the two lines are overlapped with each other. The pixels having high image qualities are, for example, the pixels of an image, which has a higher amplification factor set therefor. In contrast, for example, if the images of the two lines to be processed have the same amplification factor, the image processing circuit 108 performs an averaging process of averaging the pixel values of the pixels at the same position in the images of the two lines and using the average value. Images generated through the image combining process by the image processing circuit 108 (hereinafter referred to as combined images) are sequentially stored as the frames composing the video. The video is converted into data of a certain recording format by the recording circuit 112 and, then, is recorded on the recording medium 113 for storage.

In S205, the luminance acquiring unit 109 acquires representative values of the luminance of the image as luminance information. The acquisition of the luminance information is performed using one of the images of the two lines subjected to the image processing in the image processing circuit 108. For example, the luminance acquiring unit 109 acquires the luminance information from the image that is processed at a relatively low amplification factor, among the images of the two lines subjected to the image processing. More specifically, the luminance acquiring unit 109 performs a conversion process from the pixel values into luminance values to the pixel values (sRGB values) capable of being acquired from the image to acquire the luminance values, acquires the average, the standard deviation, and the maximum value of the luminance values as the representative values, and sets the representative values as the luminance information. The luminance acquiring unit 109 stores the acquired luminance information in the buffer 111. The conversion process from the pixel values into the luminance values may be realized by applying a common conversion matrix from the sRGB values into the luminance values to the respective pixels.

In S206, the amplification factor determining circuit 110 reads out the average, the standard deviation, and the maximum value of the luminance values, which are acquired as the luminance information in S205, from the buffer 111 to determine the amplification factors corresponding to the luminance of the object based on the pieces of information that are read out. The determination of the amplification factors corresponding to the luminance of the object will be described in detail below.

In S207, the amplification factor control circuit 115 resets the amplification factors in the imaging unit 100 based on the amplification factors determined in S206. Specifically, the amplification factor control circuit 115 resets the electrostatic capacitance of the FD 103 and the amplification factors of the PGAs 104 of the two lines based on the amplification factors determined in S206.

Then, in S208, the system control unit 117 determines whether the shooting is to be terminated. Specifically, if a shooting termination instruction is externally supplied via the operation unit 119 while S203 to S207 are being performed, the system control unit 117 issues the shooting termination instruction to the imaging control unit 114. In response to the shooting termination instruction, the imaging control unit 114 terminates the operation of the imaging unit 100. If the shooting is not to be terminated because the shooting termination instruction is not issued, the system control unit 117 goes back to S203 to perform the steps from S203 to S208 again.

<Method of Determining Amplification Factors>

Figure 4:
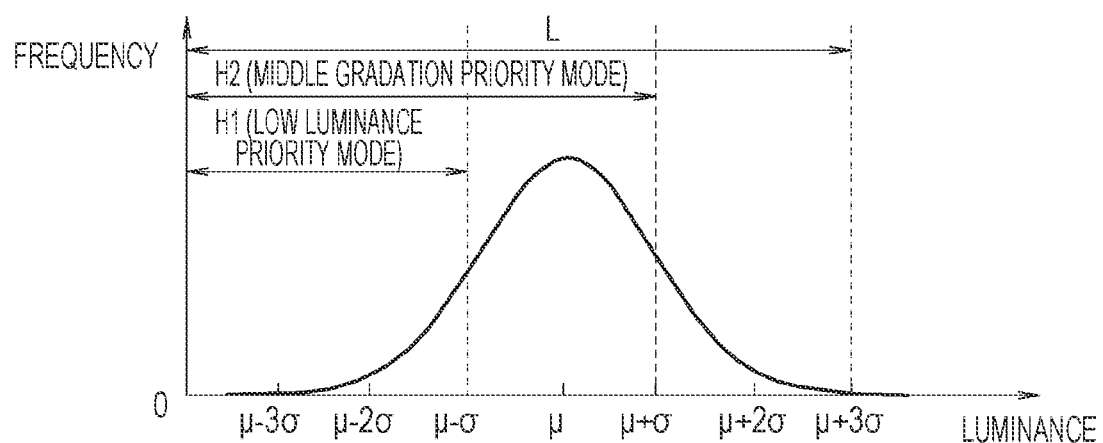
FIG. 4 is a graph for describing a method of determining the amplification factors in the first embodiment.

The determination of the amplification factors in S206 will now be described with reference to a flowchart in FIG. 3 and FIG. 4. In the present embodiment, among the two lines, the amplification factor on the line having a relatively low amplification factor is referred to as a Low gain and the amplification factor on the line having a relatively high amplification factor is referred to as a High gain. A case is exemplified in the present embodiment, in which the two values: the Low gain, which is the amplification factor on the line having a relatively low amplification factor, and the High gain, which is the amplification factor on the line having a relatively high amplification factor, are determined. In the following description, the image acquired in a state in which the Low gain is set in the imaging unit 100 (the FD 103 and the PGAs 104) is referred to as a Low gain image and the image acquired in a state in which the High gain is set in the imaging unit 100 (the FD 103 and the PGAs 104) is referred to as a High gain image.

In S301, the amplification factor determining circuit 110 acquires the average, the standard deviation, and the maximum value of the luminance values, which are acquired as the luminance information in S205 from the buffer 111.

In S302, the amplification factor determining circuit 110 determines the Low gain based on the values acquired in S301.

An exemplary method of determining the Low gain will now be described with reference to FIG. 4. FIG. 4 is a graph representing the normal distribution of the luminance values of the object using the average and the standard deviation calculated in S301. In FIG. 4, the horizontal axis represents the luminance value of the image and the vertical axis represents the frequency of occurrence of the luminance value. In the present embodiment, the Low gain is set to enable the shooting of the entire object without overexposure. Accordingly, the amplification factor determining circuit 110 sets the Low gain so as to enable the shooting of the entire normal distribution, as illustrated in a luminance range L in FIG. 4. The amplification factor at this time is represented according to Formula 1:

[Formula 1]

$$G_{Low} = (\mu + 3\sigma)\frac{G_{pre}}{I_{Max}} \quad \text{Formula (1)}$$

In Formula 1, $G_{Low}$ denotes the Low gain, $G_{pre}$ denotes the amplification factor that has been set for the image used for the acquisition of the luminance information, $\mu$ denotes the average in the luminance of the image, $\sigma$ denotes the standard deviation in the luminance of the image, and $I_{Max}$ denotes the maximum luminance value of the image.

In S303, the amplification factor determining circuit 110 acquires the state of a "setting mode" of the luminance, to which priority is given, of the imaging apparatus. "Setting modes" include, for example, a low-luminance priority setting mode, a middle-luminance priority setting mode, and a high-luminance priority setting mode. The user or the like is capable of setting the "setting mode" state. One of the setting modes is selected in the setting of the shooting conditions in S201.

In S304, the amplification factor determining circuit 110 determines the High gain based on the average, the standard deviation, and the maximum value of the luminance values acquired in S301.

An exemplary method of determining the High gain will now be described. A case is exemplified in the present embodiment, in which the low-luminance priority setting mode and the middle-luminance priority setting mode are available. The amplification factor determining circuit 110 sets the High gain so as to enable the shooting of, for example, the luminance range indicated by a range H1 in FIG. 4, when the low-luminance priority setting mode is set. The amplification factor determining circuit 110 sets the High gain so as to enable the shooting of, for example, the luminance range indicated by a range H2 in FIG. 4, when the middle-luminance priority setting mode is set. The High gains in the shooting of the luminance ranges of the respective ranges H1 and H2 are represented by Formula 2 and Formula 3:

[Formula 2]

$$G_{High1} = (\mu - \sigma)\frac{G_{pre}}{I_{Max}} \quad \text{Formula (2)}$$

[Formula 3]

$$G_{High2} = (\mu + \sigma)\frac{G_{pre}}{I_{Max}} \quad \text{Formula (3)}$$

$G_{High1}$ in Formula 2 denotes the High gain in the shooting of the luminance range of the range H1, and $G_{High2}$ in Formula 3 denotes the High gain in the shooting of the luminance range of the range H2. The amplification factor determining circuit 110 sets the value closest to $G_{High}$, among the amplification factors which the imaging apparatus is capable of setting, as the amplification value of the High gain that is practically set, where $G_{High}$ denotes both the High gains calculated according to Formula 2 and Formula 3 without distinction. For example, when the imaging apparatus is capable of setting the amplification factors of one, two, and four and $G_{High}$ calculated according to Formula 2 or Formula 3 is 2.5, the amplification factor determining circuit 110 selects two as the amplification value of the High gain that is practically set. When the luminance distribution of the object is not wider than predetermined luminance distribution, the same amplification factor, among the amplification factors which the imaging apparatus is capable of setting, is set for $G_{Low}$ and $G_{High}$.

In general, the characteristics of an output image are varied depending on the amplification factors. Accordingly, for example, the Low gain image and the High gain image have different characteristics. Specifically, although the Low gain image has a relatively wider luminance range in which the shooting is available than that of the High gain image, the luminance S/N ratio is lower than that of the High gain image. In contrast, although the High gain image has a relatively narrower luminance range in which the shooting is available than that of the Low gain image, the luminance S/N ratio is higher than that of the Low gain image. The same relationship applies to the images for which the amplification factors are set in accordance with the values of $G_{High1}$ and $G_{High2}$. Specifically, in the low-luminance priority setting mode, it is possible to achieve a relatively high effect of improving the S/N ratio only in a low luminance region of the image. In contrast, in the middle-luminance priority setting mode, it is possible to improve the S/N ratio in a wider luminance region although the effect of improving the S/N ratio is lower than that in the low-luminance priority setting mode.

Although the method of determining the two amplification factors of the High gain and the Low gain is indicated in the example described above, the present embodiment is also applicable to a case in which the imaging apparatus includes the PGAs 104 and the AD conversion circuits 105 of, for example, three or more lines and at least three amplification factors are to be determined. In this case, the amplification factor determining circuit 110 sets the same amplification factor as that of the High gain described above for the third and subsequent amplification factors. In addition, in the image combining process in S204, the image processing circuit 108 performs the process of averaging the pixel values at the same position in the images having the same amplification factor and then performs the image combination with the Low gain image.

The processing described above is performed in the imaging apparatus of the first embodiment. As described above, according to the present embodiment, it is possible to achieve the effect of improving the S/N ratio regardless of the luminance of the object by determining the amplification factors using the luminance information, such as the average and the standard deviation in the luminance of the object.

Second Embodiment

In the first embodiment described above, the amplification factors are determined based on the average and the standard deviation of the luminance values of the image. In contrast, in a second embodiment, a skewness and a kurtosis of the luminance values are calculated as the representative values of the luminance of the image and the skewness and the kurtosis of the luminance values are used as the luminance information to determine the amplification factors. Since the configuration of an imaging apparatus in the second embodiment is the same as the configuration illustrated FIG. 1, an illustration of the configuration of the imaging apparatus in the second embodiment is omitted herein. The processing flow in the second embodiment differs from that in the first embodiment in S205 and S206 in FIG. 2. In the first embodiment, the average, the standard deviation, and the maximum value of the luminance values are calculated and are stored in the buffer 111 as the luminance information in S205. In contrast, in the second embodiment, the skewness and the kurtosis of the luminance values are calculated and are stored in the buffer 111 as the luminance information in S205.

Figure 5:
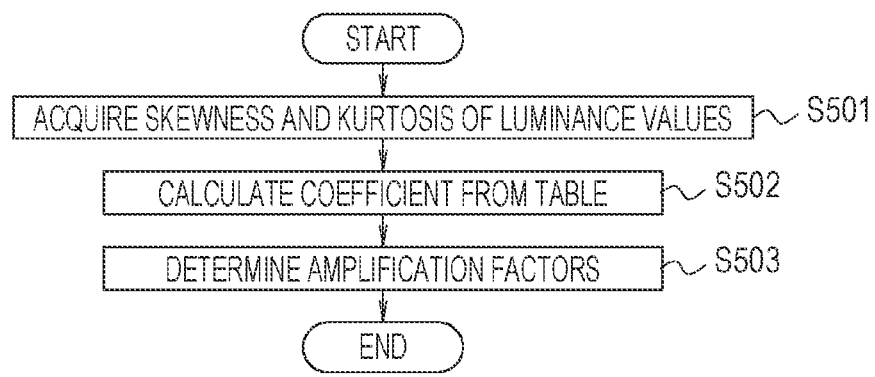
FIG. 5 is a flowchart of a process of determining the amplification factors in a second embodiment.

A process performed in the imaging apparatus of the second embodiment will now be described with reference to a flowchart illustrated in FIG. 5, focusing on the points different from the first embodiment. The flowchart in FIG. 5 indicates the processing corresponding to S206 in FIG. 2. A case is exemplified as the processing method in S206 in the second embodiment, in which the two values: the Low gain, which is the amplification factor on the line having a relatively low amplification factor, and the High gain, which is the amplification factor on the line having a relatively high amplification factor, in the two lines are determined.

In S501, the amplification factor determining circuit 110 acquires the skewness and the kurtosis of the luminance values, which are acquired as the luminance information in S205 of the second embodiment, from the buffer 111.

<Skewness and Kurtosis>

Here, the skewness and the kurtosis are indexes representing the features of the distribution of data. The skewness is a value representing how asymmetric the distribution of data is and the kurtosis is a value representing how steep the distribution of data is, compared with the normal distribution. The luminance acquiring unit 109 in the case of the second embodiment calculates a skewness S according to Formula 4 and calculates a kurtosis K according to Formula 5:

[Formula 4]

$$S = \frac{\frac{1}{n}\sum_{i=1}^{n}(x_i - \mu)^3}{\sigma^3}$$ Formula (4)

[Formula 5]

$$K = \frac{\frac{1}{n}\sum_{i=1}^{n}(x_i - \mu)^4}{\sigma^4}$$ Formula (5)

In Formula 4 and Formula 5, S denotes the skewness, K denotes the kurtosis, n denotes the total number of pieces of data about the luminance of the image, x denotes an i-th luminance value, σ denotes the standard deviation in the luminance of the image, and μ denotes the average in the luminance of the image. In the second embodiment, the skewness and the kurtosis of the luminance values are held in the buffer 111 as the luminance information.

In S502, the amplification factor determining circuit 110 calculates a coefficient using a table described below based on the skewness and kurtosis of the luminance values, which are acquired as the luminance information in S501. The table here is referred to as a coefficient table for convenience and will be described in detail below. The coefficient table is held in the ROM 118 and the calculation of the coefficient from the coefficient table is performed in, for example, the digital processing circuit 107.

In S503, the amplification factor determining circuit 110 determines the values of the Low gain and the High gain. The amplification factor determining circuit 110 calculates values given by multiplying the amplification factors set for the image used in the calculation in S205 of the skewness and the kurtosis, which are the luminance information, by the coefficients calculated based on the skewness and the kurtosis from the coefficient table in S502 and sets the calculated values as the amplification factors.

<Coefficient Table>

The coefficient table will now be described with reference to FIG. 6A and FIG. 6B. FIG. 6A illustrates an example of the coefficient table in calculation of the coefficient for the Low gain. FIG. 6B illustrates an example of the coefficient table in calculation of the coefficient for the High gain. The horizontal axis represents the skewness and the vertical axis represents the kurtosis in FIG. 6A and FIG. 6B. As described above, the value of the skewness is an index of the deviation in the luminance of the object and the value of the kurtosis is an index of the degree of kurtosis of the deviation of the luminance. For example, the luminance of the object is deviated to the high luminance side if the skewness has a negative value and the luminance of the object is deviated to the low luminance side if the skewness has a positive value. The degree of deviation is increased as the absolute value of the skewness is increased. The degree of kurtosis is increased as the value of the kurtosis is increased. Each value in the coefficient table is the coefficient by which the amplification factor set for the image used in the calculation of the skewness and the kurtosis of the luminance values in S501 is multiplied. For example, when the amplification factor set for the image used in the calculation of the skewness and the kurtosis is two and the value defined from the coefficient table is eight, the amplification factor to be determined here is 2×8=16.

In addition, the coefficient tables used in the determination of the amplification factors are not limited to the two coefficient tables of the Low gain and the High gain and may be created in accordance with the number of the amplification factors to be determined. The coefficients described in the coefficient tables are not limited to the values illustrated in FIG. 6A and FIG. 6B.

Although the method of determining the two amplification factors of the Low gain and the High gain is described in the present embodiment, there is a case in which the imaging apparatus includes the PGAs 104 and the AD conversion circuits 105 of three or more lines and at least three amplification factors are to be determined. In such a case, the same amplification factor as that of the High gain described above is set for the third and subsequent amplification factors. In addition, in this case, in the image combining process in S204, the image processing circuit 108 performs the process of averaging the pixel values at the same position in the images having the same amplification factor and then performs the image combination with the Low gain image.

The processing described above is performed in the imaging apparatus of the second embodiment. As described above, according to the present embodiment, it is possible to achieve the effect of improving the S/N ratio regardless of the luminance of the object by determining the amplification factors using the luminance information about the skewness and the kurtosis of the luminance values of the object.

Third Embodiment

Figure 7:
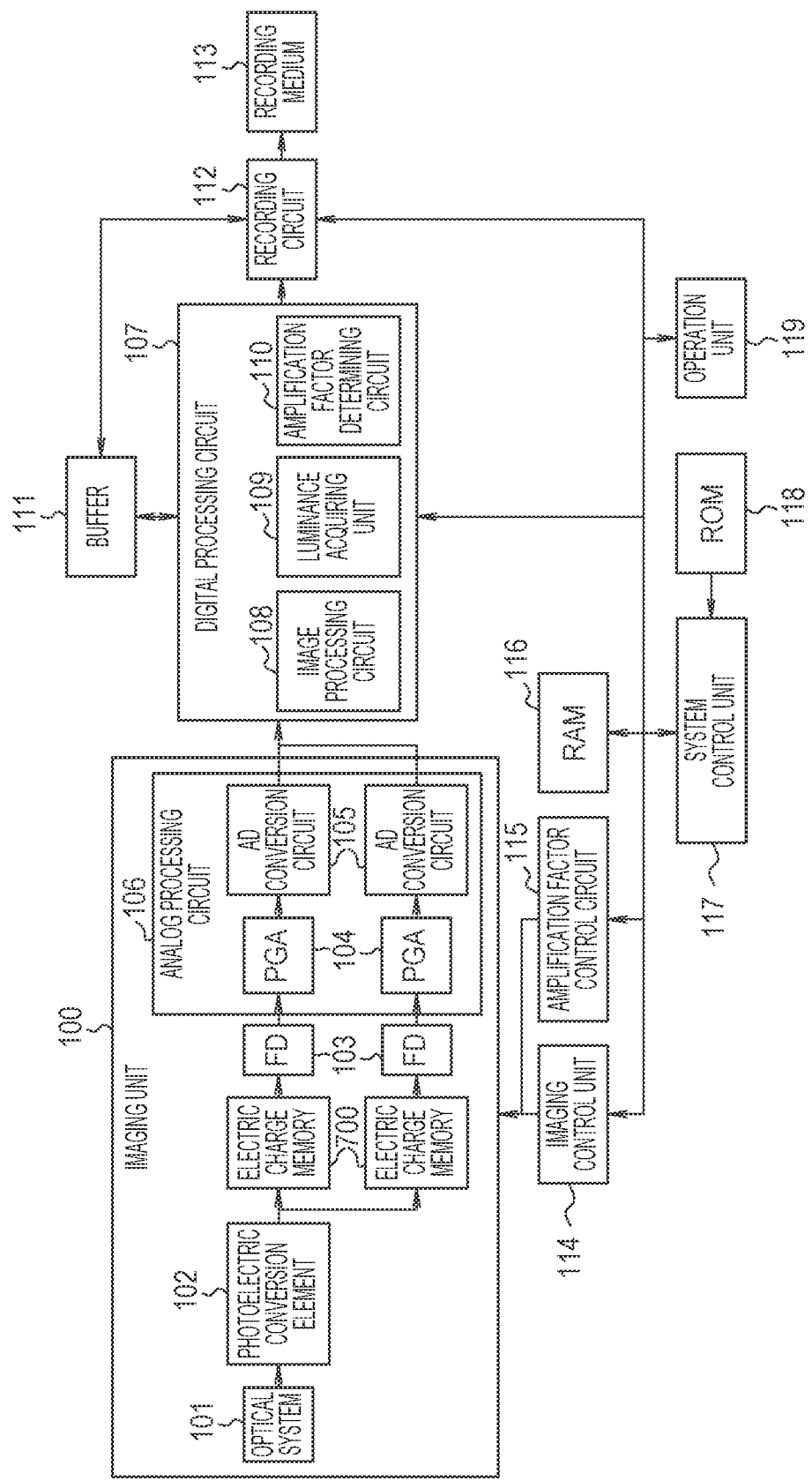
FIG. 7 is a diagram illustrating a configuration of an imaging apparatus of a third embodiment.

In a third embodiment, a method of determining the amplification factors in accordance with the luminance of the object will be described in a configuration different from that of the imaging apparatuses of the first embodiment and the second embodiment. A method is described in the third embodiment, in which electric charge memories holding the signal charge are provided, in addition to the memory (the buffer 111) holding the representative values (the average and the standard deviation or the skewness and the kurtosis) of the luminance values, and it is not necessary to determine the amplification factors in advance, for example, in the image of the previous frame. FIG. 7 is a configuration diagram illustrating an exemplary configuration of an imaging apparatus in the third embodiment. The imaging apparatus in FIG. 7 differs from the imaging apparatus in FIG. 1 in the configuration in the imaging unit 100. In the imaging apparatus in FIG. 7, the circuit is divided into, for example, two lines downstream of the photoelectric conversion element 102 and electric charge memories 700 are provided upstream of the respective FDs 103 of the two lines. The electric charge memories 700 have a function to hold the signal charge occurring in the photoelectric conversion element 102. Although the imaging apparatus in FIG. 7 has the configuration including the electric charge memories 700 of the two lines, the electric charge memories 700 of a number corresponding to the number of the lines may be provided when the FDs 103, the PGAs 104, and the AD conversion circuits 105 of three or more lines are provided. The same reference numerals are used in the configuration diagram in FIG. 7 to identify the components corresponding to those in FIG. 1 and a description of such components is omitted herein.

<Description of Shooting Operation in Imaging Apparatus of Third Embodiment>

Figure 8:
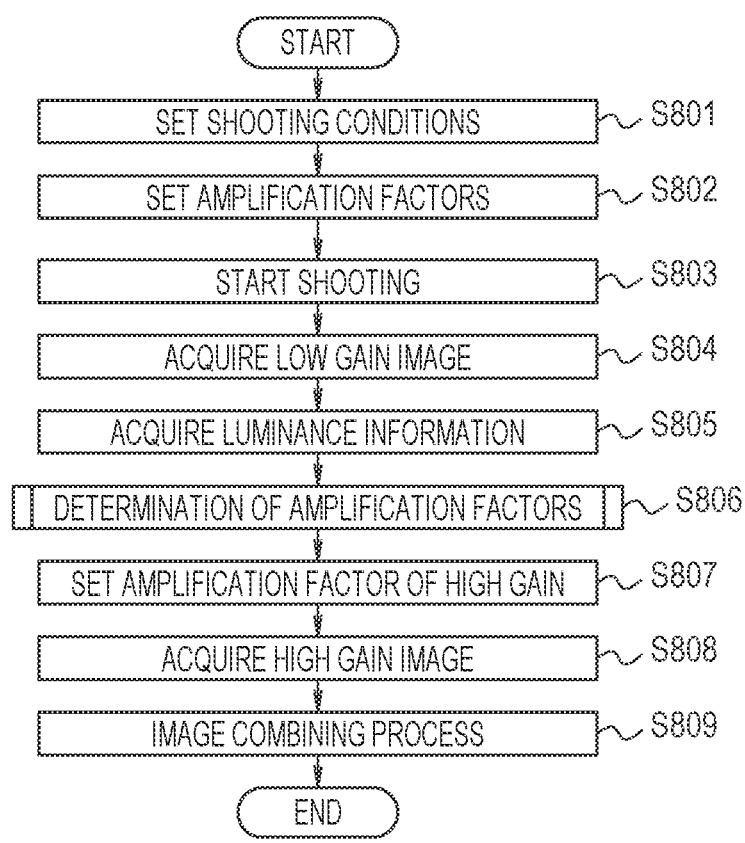
FIG. 8 is a flowchart illustrating a processing flow in the imaging apparatus of the third embodiment.

A flow of the shooting operation in the imaging apparatus of the third embodiment will now be described with reference to the configuration diagram in FIG. 7 and a flowchart illustrated in FIG. 8. An example is described in the present embodiment, in which the imaging apparatus includes the electric charge memories 700 of the two lines and the two amplification factors are to be determined.

In S801, the imaging control unit 114 sets the shooting conditions (for example, the shutter speed, the aperture, and the ISO speed) of the imaging apparatus in response to an instruction externally supplied via the operation unit 119. In the setting of the shooting conditions, the imaging control unit 114 varies the setting values of the aperture of the optical system 101, the exposure time of the photoelectric conversion element 102, and the electrostatic capacitances of the FDs 103 and the amplification factors of the PGAs 104 in the respective lines in the imaging unit 100.

In S802, the amplification factor control circuit 115 sets the electrostatic capacitances of the FDs 103 and the amplification factors of the PGAs 104 in the respective lines. The values corresponding to the shooting conditions or the values described in the ROM 118 are used as the setting values.

In S803, the imaging control unit 114 starts the shooting operation of the imaging unit 100 in response to a shooting instruction externally supplied via the operation unit 119. At this time, the imaging control unit 114 first drives the lens and the diaphragm in the optical system 101 to form an optical image of the object on the photoelectric conversion element 102. The signal charge transferred from the photoelectric conversion element 102 is supplied to the electric charge memories 700 with being distributed into the two lines and is held in the electric charge memories 700. Then, the imaging control unit 114 transfers the signal charge held in the electric charge memory 700 at the side of the path on which the Low gain, which is the relatively low amplification factor, is set in the two lines to the FD 103. This FD 103 converts the transferred signal charge into the signal voltage and supplies the signal voltage to the analog processing circuit 106. The supplied signal voltage is amplified in the PGA 104 in the analog processing circuit 106 and then is converted into the digital value in the AD conversion circuit 105. The digital value is then supplied to the digital processing circuit 107.

In S804, the image processing circuit 108 acquires the Low gain image. Specifically, the image processing circuit 108 performs the common image processing including the digital gain control, the white balance control, and the gamma correction to the digital value acquired in S803, if needed, to acquire the Low gain image.

In S805, the luminance acquiring unit 109 acquires the luminance information about the Low gain image. Specifically, the luminance acquiring unit 109 performs the conversion process from the pixel values into the luminance values to the pixel values (the sRGB values), as in S205 described above. In addition, the luminance acquiring unit 109 calculates the representative values of the luminance values and stores the calculated representative values in the buffer 111 as the luminance information. The representative values of the luminance values are exemplified by the average, the standard deviation, and the maximum value of the luminance values described in the first embodiment and the skewness and the kurtosis described in the second embodiment.

In S806, the amplification factor determining circuit 110 acquires the representative values (the luminance information) of the luminance values calculated in S805 from the buffer 111 to determine the amplification factors corresponding to the luminance of the object based on the acquired representative values. Either of the methods described above in the first embodiment and the second embodiment is used as the method of determining the amplification factors appropriate for the luminance of the object. For example, when the average, the standard deviation, and the maximum value of the luminance values described in the first embodiment are used as the representative values of the luminance values, the method of determining the amplification factors described in the first embodiment is used. For example, when the skewness and the kurtosis described in the second embodiment are used as the representative values of the luminance values, the method of determining the amplification factors described in the second embodiment is used.

Since the two methods of determining the amplification factors are described above, a description of the methods is omitted herein.

In S807, the amplification factor control circuit 115 resets the amplification factor (resets the electrostatic capacitance of the FD 103 and the amplification factor of the PGA 104) on the path on which the High gain is set, among the two lines, based on the amplification factors determined in S806.

In S808, the image processing circuit 108 acquires the High gain image. At this time, the amplification factor control circuit 115 transfers the signal charge held in the electric charge memory 700 connected to the path on which the High gain is set to the FD 103 to cause the FD 103 to convert the signal charge into the signal voltage and causes the PGA 104 in which the amplification factor is reset to amplify the signal voltage. The signal voltage amplified in the PGA 104 is converted into the digital value in the AD conversion circuit 105. Then, the image processing circuit 108 performs the common image processing including the digital gain control, the white balance control, and the gamma correction to the digital value that is input, if needed. The High gain image amplified at the amplification factor that is reset is acquired in the above manner.

In S809, the image processing circuit 108 performs the combination process of the Low gain image acquired in S804 and the High gain image acquired in S808. For example, if the two lines have different amplification factors, which are set in the imaging unit 100, the image processing circuit 108 performs the selection process of selectively using the pixels of the image having a high S/N ratio in a region where the luminance ranges of the images of the two lines are overlapped with each other. In contrast, if the two lines have the same amplification factor, the image processing circuit 108 performs the averaging process of averaging the pixel values of the pixels at the same position in the images of the two lines and using the average value. Then, the combined image subjected to the image combining process in the image processing circuit 108 is converted into data of a certain recording format by the recording circuit 112 and, then, is recorded on the recording medium 113 for storage.

The processing described above is performed in the imaging apparatus of the third embodiment. As described above, according to the present embodiment, since the electric charge memories holding the signal charge are provided, it is possible to determine the amplification factors based on the luminance information about the object, for example, even if the amplification factors are not determined in advance using the image of the previous frame. Also in the third embodiment, it is possible to achieve the effect of improving the S/N ratio regardless of the luminance of the object, as in the first and second embodiments described above.

Fourth Embodiment

In the first to third embodiments, the representative values, such as the average, the standard deviation, and the maximum value or the skewness and the kurtosis of the luminance values of the image, are acquired as the luminance information to determine the amplification factors. An imaging apparatus of a fourth embodiment described below includes an image memory 900 having a role to store the image and calculates a histogram of the luminance from the image held in the image memory 900 to determine a luminance region having a low frequency in the image based on the histogram. Then, in the imaging apparatus of the fourth embodiment, the amplification factors are determined based on the result of determination of the luminance region. Specifically, in the fourth embodiment, the luminance distribution of a shooting scene is acquired in detail and the luminance region having a low frequency in the image is determined based on the luminance distribution to determine the amplification factors based on the result of determination of the luminance region. Accordingly, in the imaging apparatus of the fourth embodiment, it is possible to set the more appropriate amplification factors for the shooting scene, compared with the method of determining the amplification factors based on the representative values described in the first to third embodiments.

Figure 9:
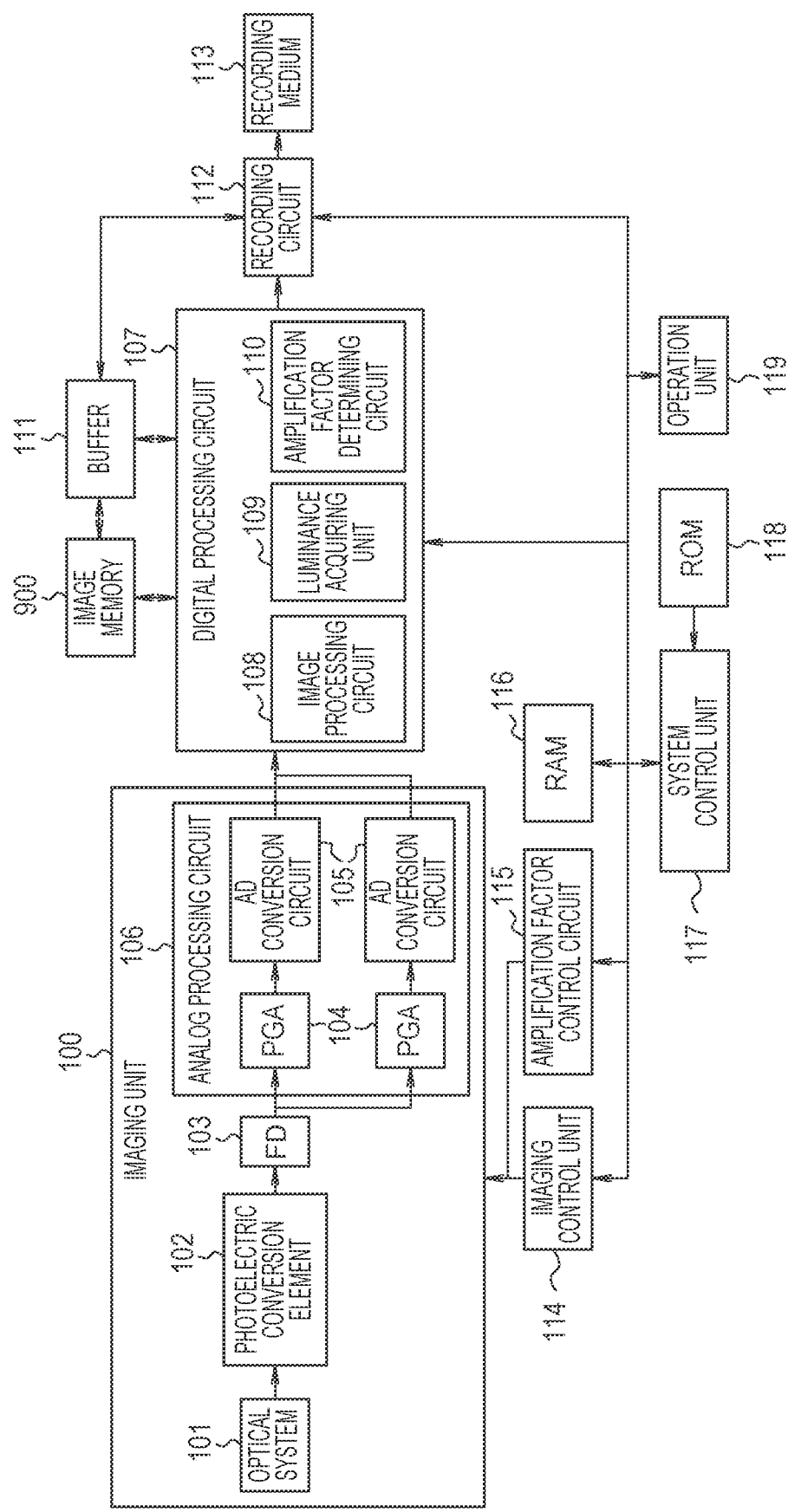
FIG. 9 is a diagram illustrating a configuration of an imaging apparatus of a fourth embodiment.

FIG. 9 is a configuration diagram illustrating an exemplary configuration of the imaging apparatus in the fourth embodiment. The imaging apparatus of the fourth embodiment illustrated in FIG. 9 differs from the configuration of the imaging apparatus illustrated in FIG. 1 in that the image memory 900 is provided. The image memory 900 has a function to hold the image. The image memory 900 is capable of holding, for example, the image acquired by the imaging unit 100 and a luminance image acquired as the luminance information in S1006 in FIG. 10 described below. The same reference numerals are used in the configuration diagram in FIG. 9 to identify the components corresponding to those in FIG. 1 and a description of such components is omitted herein.

<Description of Shooting Operation in Imaging Apparatus of Fourth Embodiment>

Figure 10:
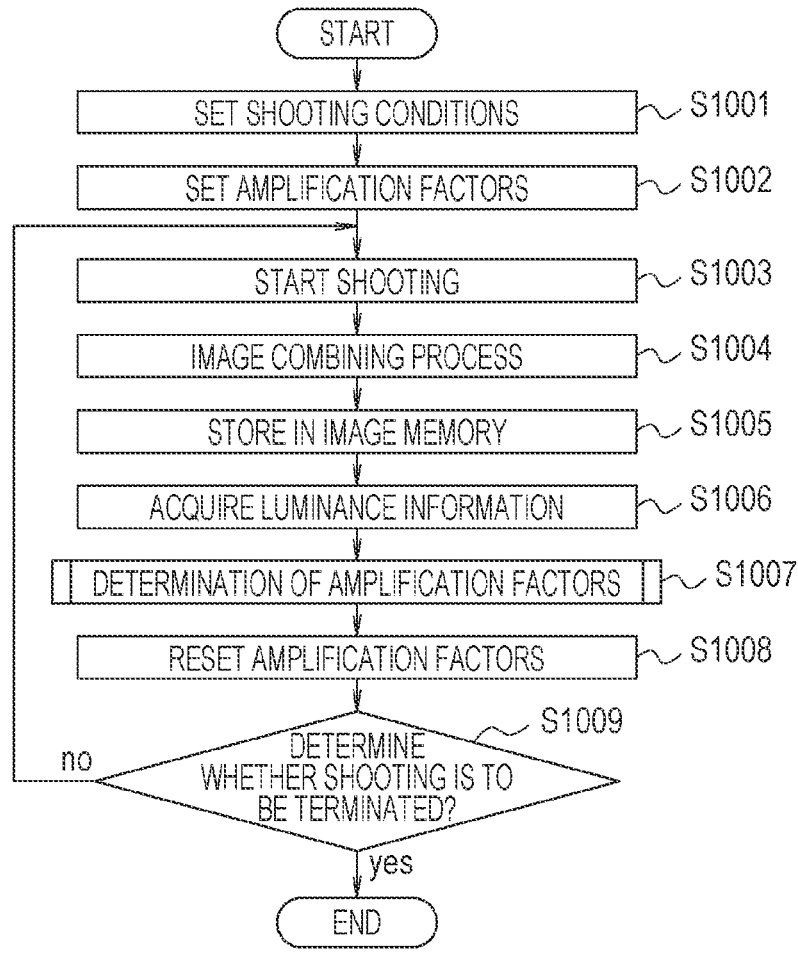
FIG. 10 is a flowchart illustrating a processing flow in the imaging apparatus of the fourth embodiment.

A flow of the shooting operation in the imaging apparatus of the fourth embodiment will now be described with reference to the configuration diagram in FIG. 9 and a flowchart illustrated in FIG. 10. An example is described also in the fourth embodiment, in which the circuit is divided into the two lines to determine the amplification factors, as in the embodiments described above.

In S1001, the imaging control unit 114 sets the shooting conditions of the imaging apparatus in response to an instruction externally supplied via the operation unit 119, as in S201 described above.

In S1002, the amplification factor control circuit 115 sets the amplification factors of the PGAs 104 and the electrostatic capacitance of the FD 103, as in S202 described above.

In S1003, the imaging control unit 114 starts the shooting operation of the imaging unit 100 in response to a shooting instruction externally supplied via the operation unit 119, as in S203 described above. As described above, the signal charge transferred from the photoelectric conversion element 102 is converted into the signal voltage in the FD 103 and then the signal voltage is supplied to the analog processing circuit 106 with being distributed into the two lines. As described above, in the analog processing circuit 106, the input signal voltage is amplified in the PGAs 104 and then is converted into the digital values in the AD conversion circuits 105. The digital values are then supplied to the digital processing circuit 107.

In S1004, the image processing circuit 108 performs the acquisition process of the images of the two lines and the image combining process, as in S204 described above. The combined image subjected to the processing in the image processing circuit 108 is converted into data of a certain recording format by the recording circuit 112 and, then, is recorded on the recording medium 113.

In S1005, the digital processing circuit 107 stores the image for which the lowest amplification factor is set, among the images acquired by the imaging unit 100, in the image memory 900.

In S1006, the luminance acquiring unit 109 acquires the luminance information about the image stored in the image memory 900. The luminance acquiring unit 109 performs the conversion process from the pixel values into the luminance values to the pixel values (the sRGB values) capable of being acquired from the image stored in the image memory 900. Then, the luminance acquiring unit 109 stores the image (hereinafter referred to as the luminance image) resulting from the conversion process into the luminance values in the image memory 900 as the luminance information. The conversion process from the pixel values into the luminance values is performed by applying the common conversion matrix from the sRGB values into the luminance values to the respective pixels, as described above.

In S1007, the amplification factor determining circuit 110 reads out the luminance image acquired as the luminance information in S1006 from the image memory 900 to determine the amplification factors corresponding to the luminance of the object based on the luminance image. The determination of the amplification factors corresponding to the luminance of the object in the fourth embodiment will be described in detail below.

In S1008, the amplification factor control circuit 115 resets the amplification factors in the imaging unit 100 based on the amplification factors determined in S1007. Specifically, the amplification factor control circuit 115 resets the electrostatic capacitance of the FD 103 and the amplification factors of the PGAs 104 of the two lines based on the amplification factors determined in S1007.

Then, in S1009, the system control unit 117 determines whether the shooting is to be terminated. If a shooting termination instruction is externally supplied via the operation unit 119 while S1003 to S1008 are being performed, the system control unit 117 issues the shooting termination instruction to the imaging control unit 114 to terminate the operation of the imaging unit 100. If the shooting is not to be terminated because the shooting termination instruction is not issued, the system control unit 117 goes back to S1003 to perform the steps from S1003 to S1009 again.

<Process of Determining Amplification Factors in Fourth Embodiment>

Figure 11:
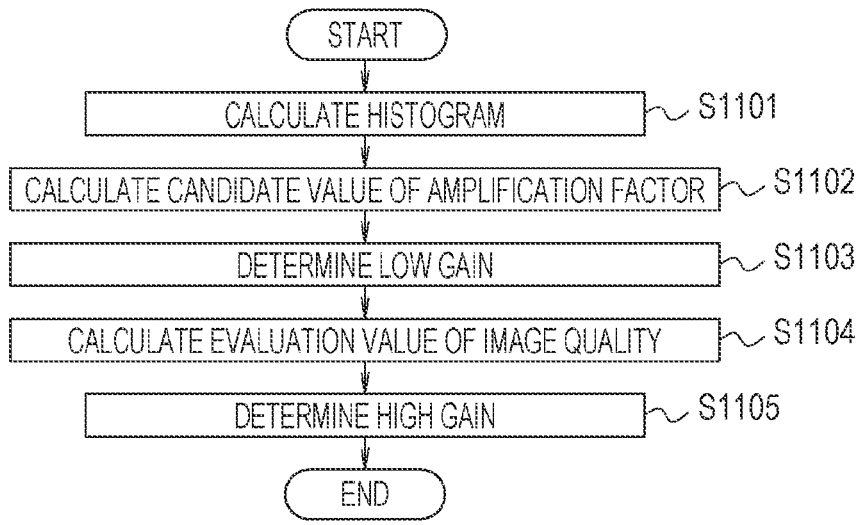
FIG. 11 is a flowchart of a process of determining amplification factors in the fourth embodiment.

The determination of the amplification factors in S1007 will now be described with reference to a flowchart in FIG. 11 and FIG. 12. The case is exemplified also in the present embodiment, in which the two values: the Low gain, which is the amplification factor on the line having a relatively low amplification factor, and the High gain, which is the amplification factor on the line having a relatively high amplification factor, in the two lines are determined, as described above.

In S1101, the luminance acquiring unit 109 calculates the histogram of the luminance based on the luminance image stored as the luminance information in S1006 and stores the information about the calculated histogram in the buffer 111.

In S1102, the amplification factor determining circuit 110 calculates the value (hereinafter referred to as a candidate value) of a candidate of the amplification factor, which is the High gain.

The method of calculating the candidate value will now be described with reference to FIG. 12.

Figure 12:
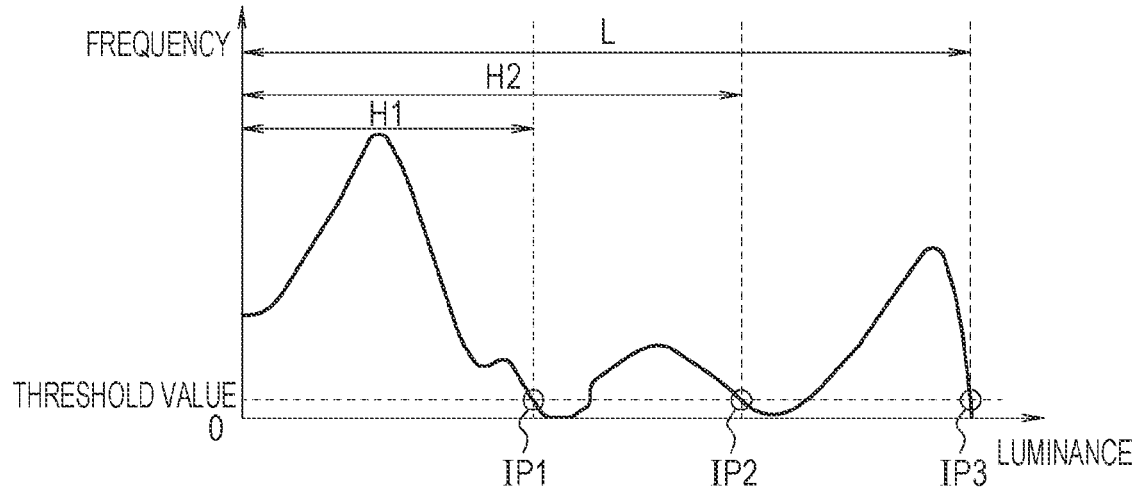
FIG. 12 is a graph for describing a method of determining the amplification factors in the fourth embodiment.

As illustrated in FIG. 12, the amplification factor determining circuit 110 first performs a threshold value process to the frequency of the histogram to acquire a point (hereinafter referred to as an inflection point) at which a portion exceeding a threshold value is changed to a portion lower than the threshold value in a direction in which the luminance is increased. In the example in FIG. 12, inflection points IP1, IP2, and IP3 are acquired. The threshold value is set to a value that prevents false detection of the inflection point due to the increase or decrease of the frequency, which is caused by noise.

Then, the amplification factor determining circuit 110 sets the amplification factors enabling the shooting of the respective luminance ranges from a luminance value "0" to the respective inflection points IP1, IP2, and IP3 acquired in the above manner as the candidate values. In the example in FIG. 12, the amplification factors enabling the shooting of the ranges H1, H2, and L, which are the luminance ranges from the luminance value "0" to the respective inflection points IP1, IP2, and IP3, are set as the candidate values. The amplification factor enabling the shooting of the luminance range from the luminance value "0" to the inflection point is calculated according to Formula 6:

[Formula 6]

$$G_C = \frac{I_C}{I_{Max}} G_{pre} \qquad \text{Formula (6)}$$

In Formula 6, $I_c$ denotes the luminance value at an arbitrary inflection point, $I_{Max}$ denotes the maximum luminance value of the image, $G_{pre}$ denotes the amplification factor set for the image used for the calculation of the histogram, and $G_c$ denotes the amplification factor in the shooting of the luminance range to the arbitrary inflection point. The amplification factor determining circuit 110 calculates the amplification factor $G_c$ for each inflection point and sets the calculated value of each amplification factor $G_c$ as the candidate value.

In S1103, the amplification factor determining circuit 110 determines the value of the Low gain. For example, the Low gain is set to a value matched with the inflection point (the inflection point IP3 in FIG. 12) having the highest luminance, among the multiple inflection points, in order to enable the shooting of the entire luminance range of the object. When the number of the inflection points in the histogram is zero or the frequency of the histogram exceeds the threshold value in the luminance range subsequent to the inflection point having the highest luminance, the Low gain is set to a value lower than the amplification factor of the image (the Low gain image in the present embodiment) used for the calculation of the histogram by one stage. When values of two, three, four, and five are capable of being set as the amplification factors and the amplification factor set for the image used for the calculation of the histogram is four, the Low gain is set to three, which is the value lower than the amplification factor set for the image used for the calculation of the histogram by one stage. At this time, when the amplification factor set for the image used for the calculation of the histogram is two, which is the lower limit of the setting value, the Low gain is set to two, which is the value of the lower limit.

In S1104, the amplification factor determining circuit 110 calculates an evaluation value of the image quality for each candidate value of the amplification factor.

The calculation of the evaluation value of the image quality will now be described. The amplification factor determining circuit 110 first sets one candidate value different from the candidate value used for calculation of the Low gain, among at least two candidate values calculated in S1102, as the High gain. If two or more candidate values do not exist, the High gain has the same value as that of the Low gain. Then, the amplification factor determining circuit 110 goes to S1108.

Then, the amplification factor determining circuit 110 calculates the image quality of the combined image in the setting described above. In the present embodiment, the S/N ratio is used as the evaluation value of the image quality. The S/N ratio of the combined image is represented by Formula 7:

[Formula 7]

$$S/N_{Mix} = \sum_{I=0}^{I_{High}} \frac{I \cdot N(I)}{\sigma(G_{High}, I)} + \sum_{I=I_{High}}^{I_{max}} \frac{I \cdot N(I)}{\sigma(G_{Low}, I)} \quad \text{Formula (7)}$$

In Formula 7, $S/N_{Mix}$ denotes the S/N ratio of the combined image, I denotes the luminance value, N(I) denotes the frequency of the luminance value I, and $I_{High}$ denotes the maximum luminance value of the High gain. In addition, in Formula 7, $G_{High}$ denotes the High gain, $G_{Low}$ denotes the Low gain, $\alpha(G_{High}, I)$ denotes the amount of noise at the luminance value I in the High gain, and $\sigma(G_{Low}, I)$ denotes the amount of noise at the luminance value I in the Low gain.

Then, the amplification factor determining circuit 110 calculates $S/N_{Mix}$ when another candidate value is set as the High gain according to Formula 7 and performs the calculation for each candidate value. Although the S/N ratio is used as the evaluation value of the image quality in the present embodiment, the evaluation value of the image quality in the present invention is not limited to the S/N ratio.

In S1105, the amplification factor determining circuit 110 determines the value of the High gain. For example, the amplification factor determining circuit 110 sets the candidate value having the highest image quality of the combined image as the High gain based on the evaluation value ($S/N_{Mix}$ in the present embodiment) of the image quality for each candidate value calculated in S1104.

Although the method of determining the two amplification factors of the High gain and the Low gain is described in the present embodiment, there is a case in which the imaging unit 100 includes the PGAs 104 and the AD conversion circuits 105 of three or more lines and at least three amplification factors are to be determined. In such a case, the same amplification factor as that of the High gain described above is set for the third and subsequent amplification factors. In addition, in the image combining process in S1004, the image processing circuit 108 first performs the process of averaging the pixel values at the same position in the images having the same amplification factor and then performs the image combination with the Low gain image.

The processing described above is performed in the fourth embodiment. As described above, according to the fourth embodiment, since the amplification factors are determined in consideration of the portion having a low frequency of the histogram, it is possible to set the more appropriate amplification factors for the shooting scene, compared with the cases in the first to third embodiments.

Fifth Embodiment

Figure 13:
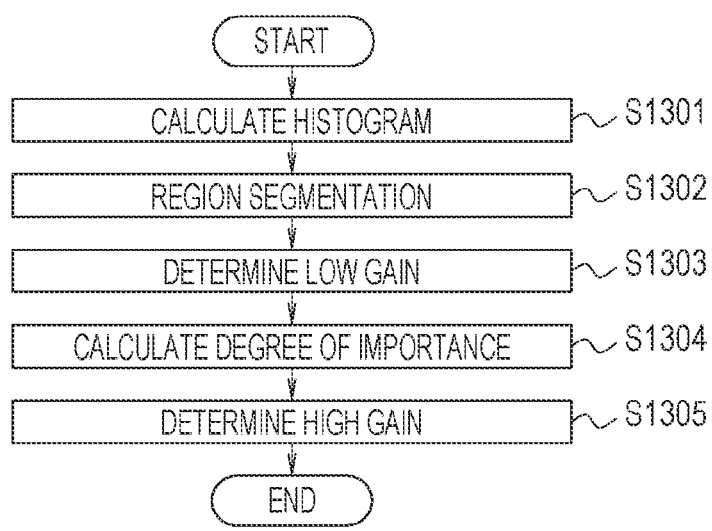
FIG. 13 is a flowchart of a process of determining amplification factors in a fifth embodiment.

In a fifth embodiment, the amplification factors are determined based on the histogram of the image and the degrees of importance of peaks of the histogram. Since the configuration of an imaging apparatus in the fifth embodiment is the same as the configuration illustrated FIG. 9, an illustration of the configuration of the imaging apparatus in the fifth embodiment is omitted herein. The processing flow in the fifth embodiment differs from that in the fourth embodiment in S1007 in FIG. 10. The fifth embodiment is described, focusing on the points different from the fourth embodiment. The processing flow performed in the imaging apparatus of the fifth embodiment is described with reference to a flowchart illustrated in FIG. 13 and FIG. 9. The case is described also in the fifth embodiment, in which the two values: the Low gain, which is the amplification factor on the line having a relatively low amplification factor, and the High gain, which is the amplification factor on the line having a relatively high amplification factor, are determined, as in the embodiments described above.

In S1301, the luminance acquiring unit 109 calculates the histogram of the luminance based on the luminance image acquired as the luminance information in S1006 and stores the result of the calculation in the buffer 111.

Figure 14:
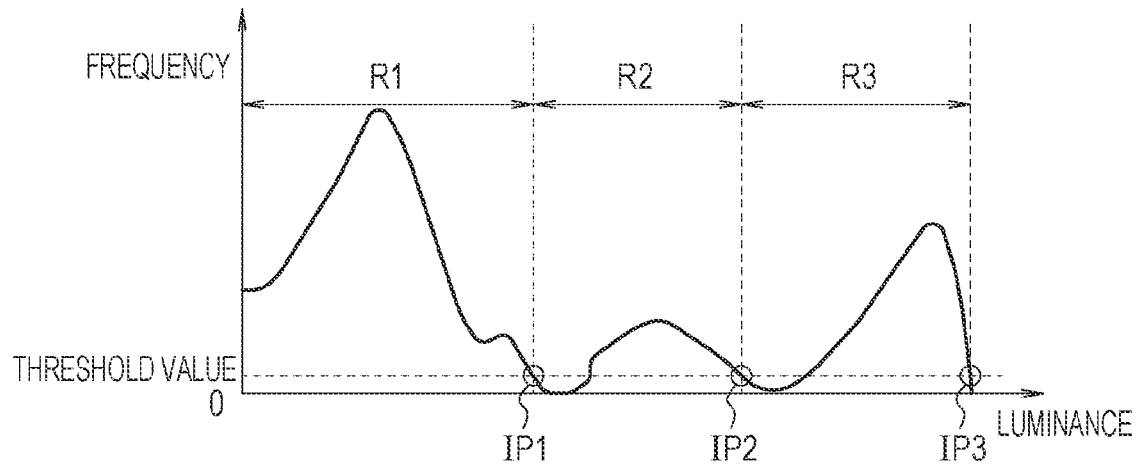
FIG. 14 is a graph for describing a method of determining the amplification factors in the fifth embodiment.

In S1302, the amplification factor determining circuit 110 performs region segmentation of the histogram in the luminance direction. In S1302, the amplification factor determining circuit 110 first performs the threshold value process to the frequency of the histogram to acquire the inflection point at which a portion exceeding a threshold value is changed to a portion lower than the threshold value in a direction in which the luminance is increased, as illustrated in FIG. 14. In the example in FIG. 14, the inflection points IP1, IP2, and IP3 are acquired. The threshold value is set to a value that prevents false detection of the inflection point due to the increase or decrease of the frequency, which is caused by noise, as described above with reference to FIG. 12. Then, the amplification factor determining circuit 110 segments the histogram into a range (a region R1 in FIG. 14) from the luminance value "0" to the inflection point having the lowest luminance value and ranges (a region R2 and a region R3 in FIG. 14) between continuous two inflection points.

In S1303, the amplification factor determining circuit 110 determines the value of the Low gain. As in S1103 described above, for example, the Low gain is set to a value matched with the inflection point (the inflection point IP3 in FIG. 14) having the highest luminance, among the multiple inflection points, in order to enable the shooting of the entire luminance range of the object. As described above, when the number of the inflection points in the histogram is zero or the frequency of the histogram exceeds the threshold value in the luminance range subsequent to the inflection point having the highest luminance, the Low gain is set to a value lower than the amplification factor of the image (the Low gain image) used for the calculation of the histogram by one stage.

In S1304, the amplification factor determining circuit 110 sets the degree of importance of each region resulting from the segmentation in S1302. In the present embodiment, the maximum value is used as the index of the degree of importance. The amplification factor determining circuit 110 calculates the maximum value of the frequency of the histogram for each region and defines the degrees of importance in the descending order of the maximum values. The amplification factor determining circuit 110 defines the degrees of importance, for example, such that a degree of importance "1", which is the highest degree of importance, is set to the region having the highest maximum value and a degree of importance "2", which is the second highest degree of importance, is set to the region having the second highest maximum value. The index of the degree of importance is not limited to the maximum value. For example, the total number of frequencies in the region may be used as the index of the degree of importance.

In S1305, the amplification factor determining circuit 110 determines the value of the High gain. The High gain is set to a value enabling the shooting of the region having the highest degree of importance defined in S1304. Specifically, the amplification factor determining circuit 110 sets the amplification factor enabling the shooting of the luminance range to the inflection point having the higher luminance at the inflection point at which the region of the degree of importance "1" is set. The amplification factor at this time is calculated according to Formula 6 described in the fourth embodiment. When two or more inflection points do not exist, the High gain has the same value as that of the Low gain. Then, the processing flow goes to S1008.

Although the method of determining the two amplification factors of the High gain and the Low gain is described in the present embodiment, there is a case in which the imaging unit 100 includes the PGAs 104 and the AD conversion circuits 105 of three or more lines and at least three amplification factors are to be determined. In this case, the same amplification factor as that of the High gain described above is set for the third and subsequent amplification factors. In the image combining process in S1004, the image processing circuit 108 performs the averaging process of the images having the same amplification factor and then performs the image combination with the Low gain image.

The processing described above is performed in the fifth embodiment. In the fifth embodiment, since the degrees of importance are calculated for the respective regions resulting from the segmentation of the histogram and the amplification factors are determined based on the degrees of importance, it is possible to set the more appropriate amplification factors for the shooting scene, compared with the first to third embodiments.

Sixth Embodiment

In a sixth embodiment, a method of determining the amplification factors based on the luminance of the object in a configuration different from those of the imaging apparatuses of the fourth embodiment and the fifth embodiment.

Figure 15:
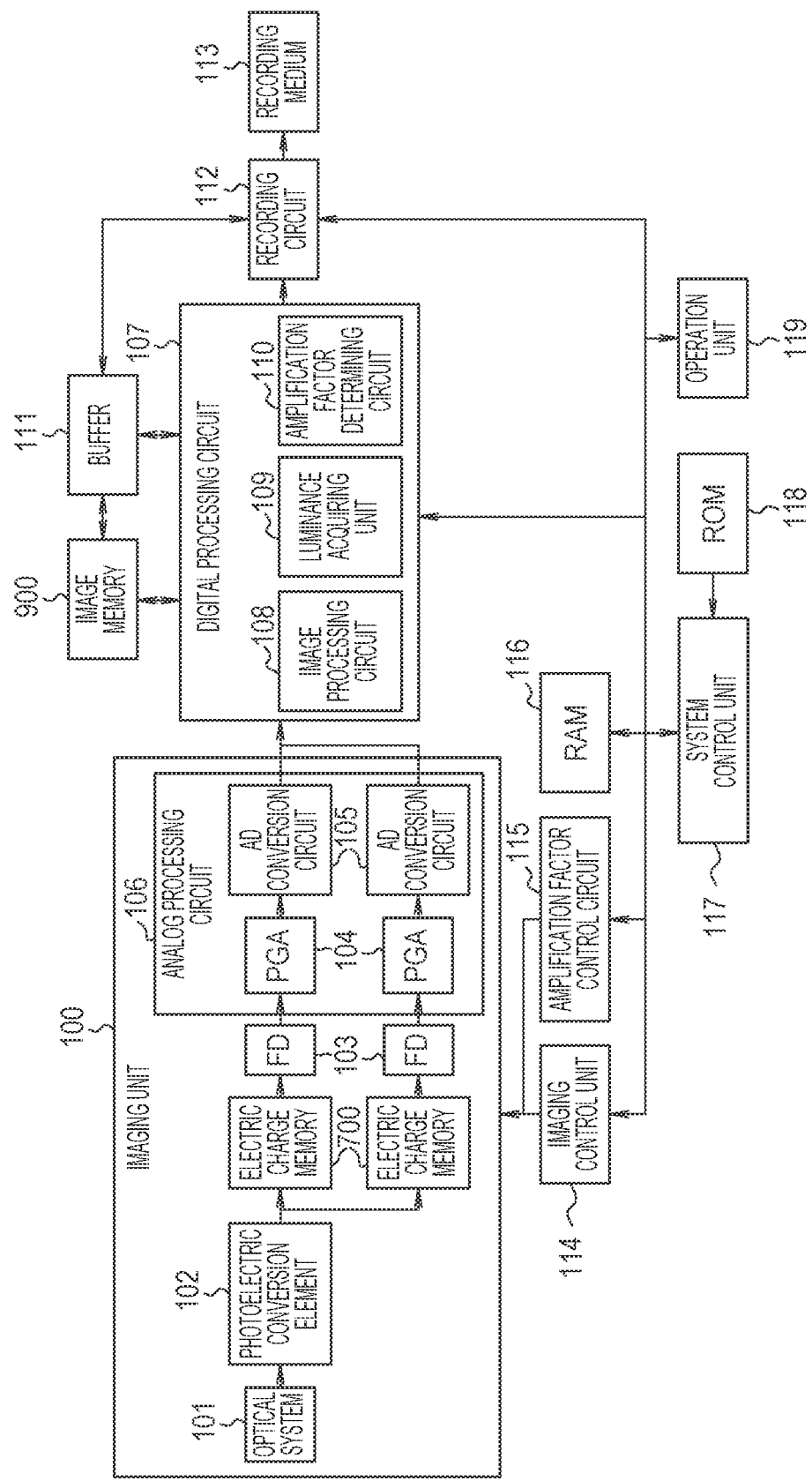
FIG. 15 is a diagram illustrating a configuration of an imaging apparatus of a sixth embodiment.

FIG. 15 a is a configuration diagram illustrating an exemplary configuration of an imaging apparatus of the sixth embodiment. The imaging apparatus in FIG. 15 differs from the imaging apparatus in FIG. 9 in the configuration in the imaging unit 100. In the imaging apparatus in FIG. 15, the circuit is divided into two lines downstream of the photoelectric conversion element 102 and the electric charge memories 700 are provided upstream of the respective FDs 103 of the two lines, as in the exemplary configuration in FIG. 7. Although the imaging apparatus in FIG. 15 has the configuration including the electric charge memories 700 of the two lines, the electric charge memories 700 of three or more lines may be provided. The same reference numerals are used in the configuration diagram in FIG. 15 to identify the components corresponding to those in FIG. 1, FIG. 7, and FIG. 9 and a description of such components is omitted herein.

<Description of Shooting Operation in Imaging Apparatus of Sixth Embodiment>

Figure 16:
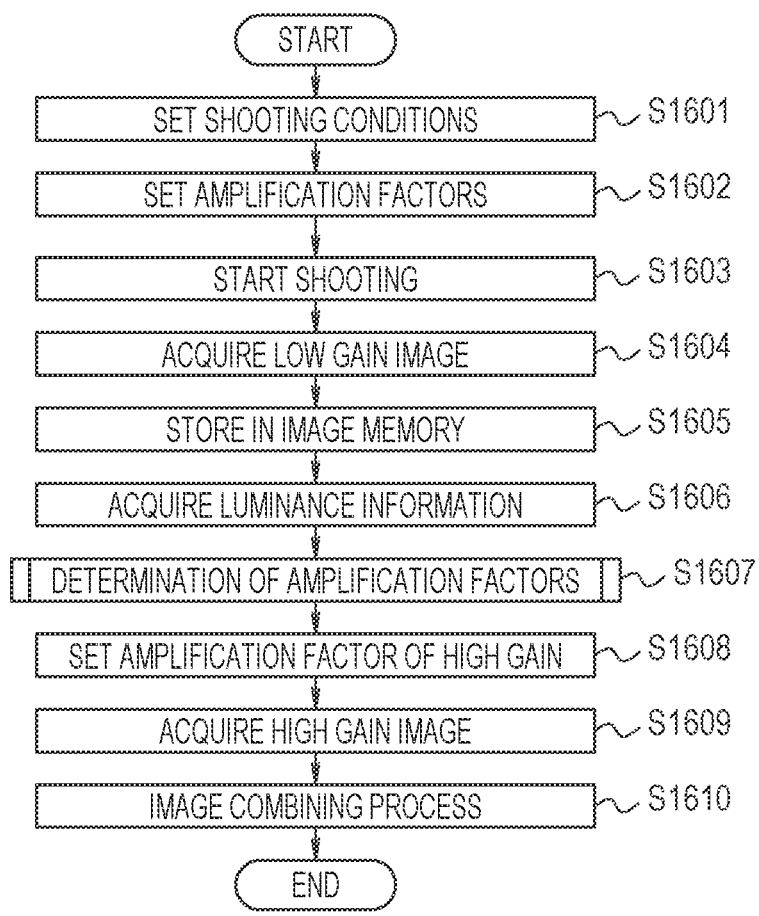
FIG. 16 is a flowchart illustrating a processing flow in the imaging apparatus of the sixth embodiment.

A flow of the shooting operation in the imaging apparatus of the sixth embodiment will now be described with reference to the configuration diagram in FIG. 15 and a flowchart illustrated in FIG. 16. An example is described in the present embodiment, in which the imaging apparatus includes the electric charge memories 700 of the two lines and the two amplification factors are to be determined.

In S1601, the imaging control unit 114 sets the shooting conditions of the imaging apparatus in response to an instruction externally supplied via the operation unit 119, as in S801 described above.

In S1602, the amplification factor control circuit 115 sets the electrostatic capacitances of the FDs 103 and the amplification factors of the PGAs 104 in the respective lines, as in S802 described above.

In S1603, the imaging control unit 114 starts the shooting operation of the imaging unit 100 in response to a shooting instruction externally supplied via the operation unit 119, as in S803 described above. The signal charge transferred from the photoelectric conversion element 102 is supplied to the electric charge memories 700 with being distributed into the two lines and is held in the electric charge memories 700. Then, as described above, the imaging control unit 114 transfers the signal charge held in the electric charge memory 700 at the side of the path on which the Low gain, which is the relatively low amplification factor, is set in the two lines to the FD 103. The FD 103 converts the transferred signal charge into the signal voltage and supplies the signal voltage to the analog processing circuit 106. The supplied signal voltage is amplified in the PGA 104 in the analog processing circuit 106 and then is converted into the digital value in the AD conversion circuit 105. The digital value is supplied to the digital processing circuit 107.

In S1604, the image processing circuit 108 performs the common image processing, if needed, to acquire the Low gain image, as in S804 described above.

In S1605, the digital processing circuit 107 stores the Low gain image acquired in S1604 in the image memory 900.

In S1606, the luminance acquiring unit 109 acquires the luminance information about the image stored in the image memory 900. Specifically, the luminance acquiring unit 109 performs the conversion process from the pixel values into the luminance values to the pixel values (the sRGB values) capable of being acquired from the image stored in the image memory 900. Then, the luminance acquiring unit 109 stores the luminance image resulting from the conversion process into the luminance values in the image memory 900 as the luminance information.

In S1607, the amplification factor determining circuit 110 reads out the luminance image acquired as the luminance information in S1606 from the image memory 900 111 to determine the amplification factors appropriate for the luminance of the object based on the luminance image. Either of the processes of determining the amplification factors, described above in the fourth embodiment and the fifth embodiment, is used as the process of determining the amplification factors appropriate for the luminance of the object. Since the two processes of determining the amplification factors are described above, a description of the methods is omitted herein.

In S1608, the amplification factor control circuit 115 resets the amplification factor on the path on which the High gain is set based on the amplification factors determined in S1607. Specifically, the amplification factor control circuit 115 resets the electrostatic capacitances of the FDs 103 and the amplification factors of the PGAs 104 of the two lines based on the amplification factors determined in S1607.

In S1609, the image processing circuit 108 acquires the High gain image. At this time, the amplification factor control circuit 115 transfers the signal charge held in the electric charge memory 700 connected to the path on which the High gain is set to the FD 103 to cause the FD 103 to convert the signal charge into the signal voltage. The signal voltage is amplified in the PGA 104 and then is converted into the digital value in the AD conversion circuit 105. Then, the image processing circuit 108 performs the common image processing to the digital value that is input, if needed to acquire the High gain image.

In S1610, the image processing circuit 108 performs the combination process of the Low gain image acquired in 1604 and the High gain image acquired in S1609. Here, if the two lines have different amplification factors, which are set in the imaging unit 100, the image processing circuit 108 performs the selection process of selectively using the pixels of the image having a higher image quality (for example, the pixels for which higher amplification factors are set) in a region where the luminance ranges of the images of the two lines are overlapped with each other. In contrast, if the two lines have the same amplification factor, the image processing circuit 108 performs the averaging process of averaging the pixel values of the pixels at the same position in the images of the two lines and using the average value. Then, the combined image subjected to the image combining process in the image processing circuit 108 is converted into data of a certain recording format by the recording circuit 112 and, then, is recorded on the recording medium 113 for storage.

The processing described above is performed in the imaging apparatus of the sixth embodiment. The imaging apparatus of the sixth embodiment includes the electric charge memories holding the signal charge and the method of determining the amplification factors in either of the fourth embodiment and the fifth embodiment described above is performed in the imaging apparatus of the sixth embodiment. Accordingly, it is possible to determine the amplification factors based on the luminance information about the object even if the amplification factors are not determined in advance.

Seventh Embodiment

In the combination processes in the first to sixth embodiments described above, the image processing circuit 108 selects the pixels having higher amplification factors if the two lines have different amplification factors and performs the averaging for output if the two lines have the same amplification factor in the region in which the luminance ranges are overlapped. In contrast, in a seventh embodiment, the image processing circuit 108 performs the combination using weights based on the amplification factors.

A combination method using the weights based on the amplification factors will now be described. Since the configuration diagram of the seventh embodiment is the same as that of the first embodiment, illustration and description of the configuration are omitted herein. In the seventh embodiment, the combination process using the weights based on the amplification factors is performed in, for example, in S204 described above.

In the seventh embodiment, the High gain of the amplification factor determined by the amplification factor determining circuit 110 is denoted by $G_{High}$, the Low gain thereof is denoted by $G_{Low}$, a combined weight of a High gain image $I_{High}$ and a Low gain image $I_{Low}$ is denoted by w, and a saturated pixel value of the Low gain image is denoted by Max. In this case, a combined image $I_{Mix}$ of the High gain image $I_{High}$ and the Low gain image $I_{Low}$ at a (x, y) coordinate is represented by Formula 8:

[Formula 8]

$$\text{if } (I_{LOW}(x, y) < \text{Max}) \quad \quad \text{Formula (8)}$$
$$I_{Mix}(x, y) = w * \frac{G_{High}}{G_{Low}} * I_{Low}(x, y) + (1 - w) * I_{High}(x, y)$$
$$\text{else}$$
$$I_{Mix}(x, y) = \frac{G_{High}}{G_{Low}} * I_{Low}(x, y)$$

The standard deviation of light shot noise is denoted by $\sigma_s$, the standard deviation of dark current noise is denoted by $\sigma_d$, read-out noise occurring when the amplification factor is the High gain is denoted by $\sigma_{High}$, and read-out noise occurring when the amplification factor is the Low gain is denoted by $\sigma_{Low}$. Standard deviation $\sigma_{Mix}$, of noise of the combined image $I_{Mix}$ in this case is represented according to Formula 9:

[Formula 9]

$$\sigma_{Mix}^2 = \sigma_s^2 + \sigma_d^2 + w^2 * \left(\frac{G_{High}}{G_{Low}}\right)^2 * \sigma_{Low}^2 + (1 - w)^2 * \sigma_{High}^2 \quad \text{Formula (9)}$$

The combined weight w at which the standard deviation $\sigma_{Mix}$ is minimized is represented according to Formula 10:

[Formula 10]

$$w = \frac{\sigma_{High}^2}{\left(\frac{G_{High}}{G_{Low}}\right)^2 * \sigma_{Low}^2 * \sigma_{High}^2} \quad \text{Formula (10)}$$

The image processing circuit 108 performs the combination using the combination method represented by Formula 8 using the combined weight w calculated according to Formula 10. In Formula 10, the combined weight w is increased as the ratio ($G_{High}/G_{Low}$) of the amplification factor $G_{High}$ of the High gain to the amplification factor $G_{Low}$ of the Low gain comes close to one and w=0.5, which is the maximum value, if the amplification factor $G_{High}$ of the High gain is equal to the amplification factor $G_{Low}$ of the Low gain, that is, if the ratio is 1.0. At this time, the combined image $I_{Mix}$ is the result of averaging of the High gain image $I_{High}$ and the Low gain image $I_{Low}$.

The processing described above is performed in the seventh embodiment. In the seventh embodiment, the High gain image is combined with the Low gain image using the weights considering the amount of read-out noise, in addition to the amplification factors of the High gain and the Low gain. Accordingly, according to the seventh embodiment, it is possible to reduce the amount of noise after the combination, compared with the cases in which the combination processes described in the first to sixth embodiments are performed.

Eighth Embodiment

The amplification factors of the High gain and the Low gain are determined based on the amplification factor of the previous frame in the first embodiment described above, In contrast, an example is described in an eighth embodiment, in which the amplification factors of the High gain and the Low gain are determined in preliminary shooting and only the amplification factor of the High gain is varied with the amplification factor of the Low gain being fixed in shooting. Since the configuration diagram of the eighth embodiment is the same as that of the first embodiment, illustration and description of the configuration are omitted herein.

<Description of Shooting Operation in Imaging Apparatus of Eighth Embodiment>

A flow of the shooting operation in the imaging apparatus of the eighth embodiment will now be described with reference to a flowchart illustrated in FIG. 17.

Figure 17:
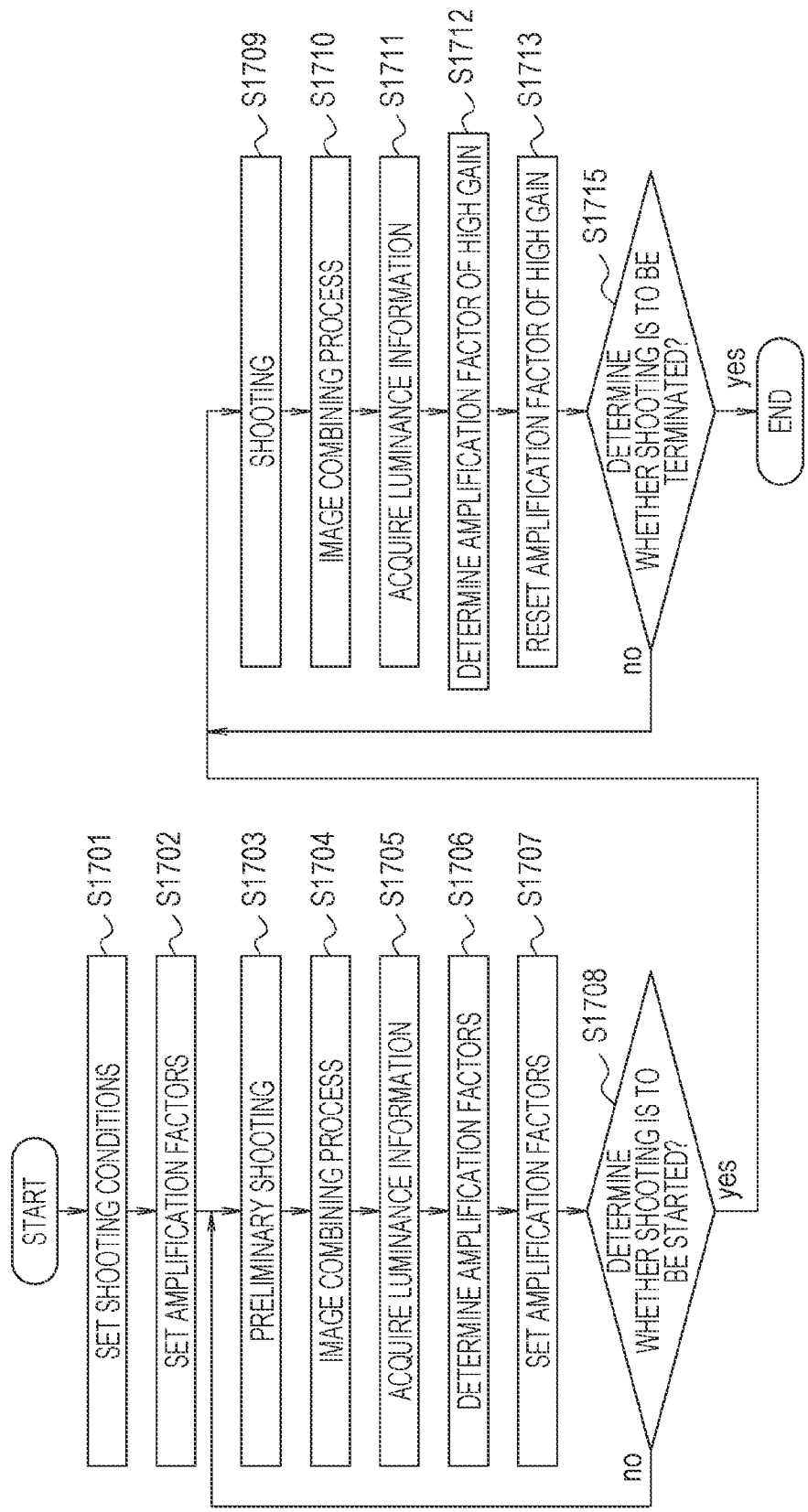
FIG. 17 is a flowchart illustrating a processing flow in an imaging apparatus of an eighth embodiment.

In S1701 in FIG. 17, the imaging control unit 114 sets the shooting conditions of the imaging apparatus in response to an instruction externally supplied via the operation unit 119, as in S201 described above.

In S1702, the amplification factor control circuit 115 sets the amplification factors of the PGAs 104 and the electrostatic capacitance of the FD 103, as in S202 described above.

In S1703, the imaging control unit 114 starts a preliminary shooting operation of the imaging unit 100 in response to a shooting instruction externally supplied via the operation unit 119.

In S1704, the image processing circuit 108 performs the acquisition process of the images of the two lines output in the preliminary shooting operation in S1703 and the image combining process to combine the images of the two lines and output the generated image.

In S1705, the luminance acquiring unit 109 acquires the representative values of the luminance of a preliminary shooting image resulting from the image combination in S1704 as the luminance information and stores the acquired luminance information in the buffer, as in S205.

In S1706, the amplification factor determining circuit 110 reads out the average, the standard deviation, and the maximum value of the luminance values, which are acquired as the luminance information in S1705, from the buffer 111 to determine the amplification factors corresponding to the luminance of the object based on the pieces of information that are read out, as in S206.

In S1707, the amplification factor control circuit 115 resets the amplification factors in the imaging unit 100 based on the amplification factors determined in S1706, as in S207.

In S1708, the system control unit 117 determines whether the shooting is to be started. The system control unit 117 goes to S1709 if the shooting is to be started and goes back to S1703 to perform the steps from S1703 to S1708 again if the shooting is not to be started.

In S1709, the imaging control unit 114 controls the imaging unit 100 to start the shooting operation.

In 1710, the image processing circuit 108 performs the acquisition process of the images of the two lines acquired in the shooting operation in S1709 and the image combining process to combine the images of the two lines and output the generated image. Then, the combined images resulting from the image combining process in the image processing circuit 108 are sequentially stored as the frames composing the video.

In S1711, the luminance acquiring unit 109 acquires the representative values of the luminance of the shooting image resulting from the image combination in S1710 as the luminance information, as in S205.

In S1712, the amplification factor determining circuit 110 reads out the luminance information acquired and stored in S1705 from the buffer 111 to determine the amplification factor corresponding to the luminance of the object based on the information. At this time, the amplification factor determining circuit 110 determines only the amplification factor of the High gain with the amplification factor of the Low gain being fixed.

In S1713, the amplification factor control circuit 115 resets the amplification factor of the High gain determined in S1712.

Then, in S1715, the system control unit 117 determines whether the shooting is to be terminated. If the shooting is not to be terminated, the system control unit 117 goes back to S1709 to perform the steps from S1709 to S1715 again. If the shooting is to be terminated, the system control unit 117 terminates the process of the flowchart in FIG. 17.

The processing described above is performed in the eighth embodiment. In the eighth embodiment, the amplification factor of the High gain is controlled during the shooting. Accordingly, according to the eighth embodiment, it is possible to reduce the variation in the luminance of the combined image due to the variation of the amplification factors of the High gain and the Low gain when the luminance distribution of the object is varied with time.

Ninth Embodiment

In the eighth embodiment, the amplification factors of the High gain and the Low gain are determined in the preliminary shooting and only the amplification factor of the High gain is reset in the shooting. An example is described in a ninth embodiment, in which it is assumed that still-image shooting is performed and the shooting is performed once, that is, the still-image shooting is performed using the amplification factors determined in the preliminary shooting. Since the configuration diagram of the ninth embodiment is the same as that of the first embodiment, illustration and description of the configuration are omitted herein.

<Description of Shooting Operation in Imaging Apparatus of Ninth Embodiment>

A flow of the shooting operation in the imaging apparatus of the ninth embodiment will now be described with reference to a flowchart illustrated in FIG. 18.

Figure 18:
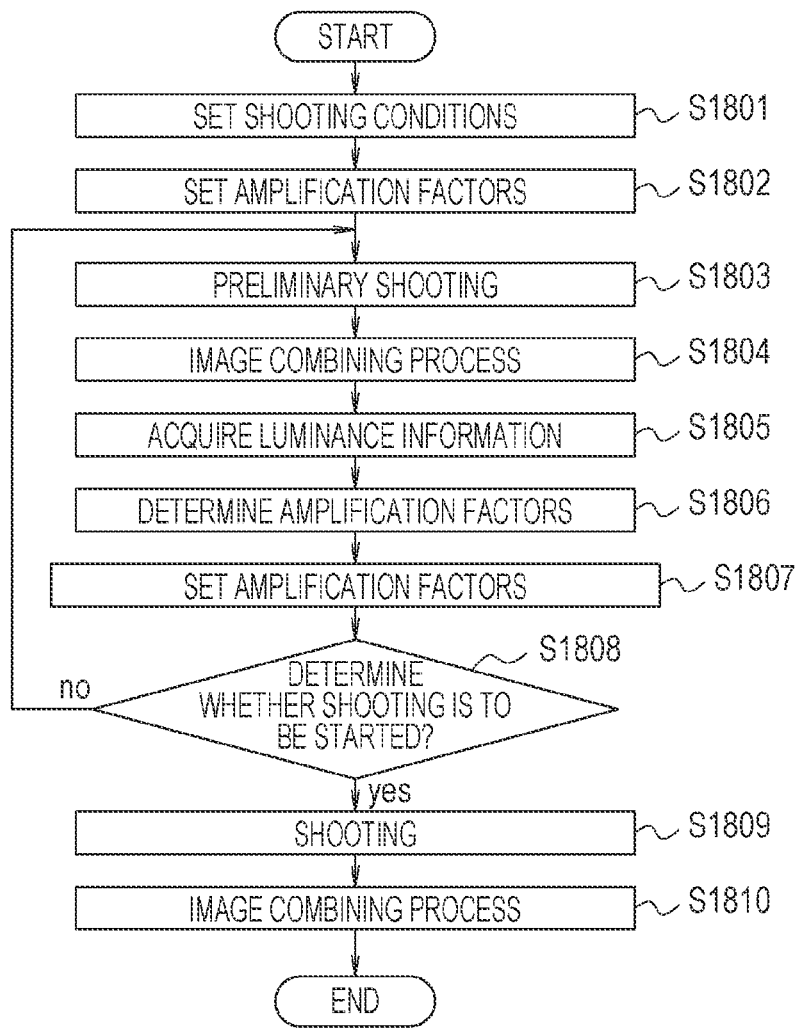
FIG. 18 is a flowchart illustrating a processing flow in an imaging apparatus of a ninth embodiment.

In S1801 in FIG. 18, the imaging control unit 114 sets the shooting conditions of the imaging apparatus in response to an instruction externally supplied via the operation unit 119, as in S201.

In S1802, the amplification factor control circuit 115 sets the amplification factors of the PGAs 104 and the electrostatic capacitance of the FD 103, as in S202.

In S1803, the imaging control unit 114 starts the preliminary shooting operation of the imaging unit 100 in response to a shooting instruction externally supplied via the operation unit 119, as in S1703.

In S1804, the image processing circuit 108 performs the acquisition process of the images of the two lines output in S1803 and the image combining process to combine the images of the two lines and output the generated image, as in S1704.

In S1805, the luminance acquiring unit 109 acquires the representative values of the luminance of the preliminary shooting image resulting from the image combination in S1804 as the luminance information and stores the acquired luminance information in the buffer, as in S1705.

In S1806, the amplification factor determining circuit 110 reads out the luminance information acquired in S1805 from the buffer 111 to determine the amplification factors corresponding to the luminance of the object based on the information, as in S1706.

In S1807, the amplification factor control circuit 115 resets the amplification factors in the imaging unit 100 based on the amplification factors determined in S1806, as in S1707.

In S1808, the system control unit 117 determines whether the shooting of the still image is to be started. The system control unit 117 goes to S1809 if the shooting is to be started and goes back to S1803 to perform the steps from S1803 to S1808 again if the shooting is not to be started.

In S1809, the imaging control unit 114 causes the imaging unit 100 to start the shooting operation. In S1810, the image processing circuit 108 performs the image combining process and stores the combined image.

The processing described above is performed in the ninth embodiment. In the ninth embodiment, it is possible to determine the amplification factors of the High gain and the Low gain in the preliminary shooting and to perform the still-image shooting using the determined amplification factors.

Other Embodiments

Figure 19:
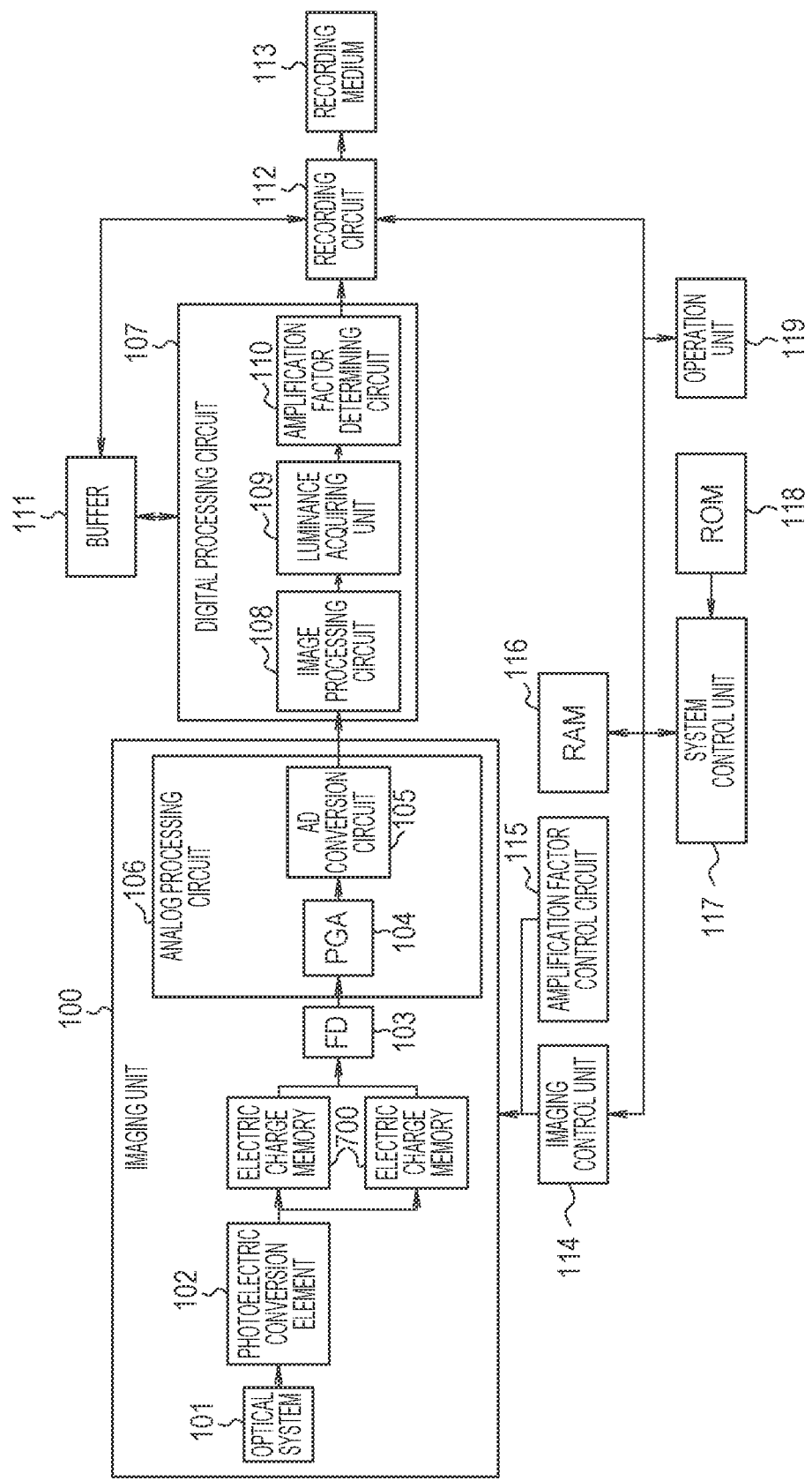
FIG. 19 is a diagram illustrating a configuration of an imaging apparatus of another embodiment.

Although the example is described in the first to ninth embodiments described above, in which the analog processing circuit 106 includes the PGAs 104 and the AD conversion circuits 105 of the two lines, a configuration may be adopted in which the analog processing circuit 106 includes the PGA 104 and the AD conversion circuit 105 of only one line, as illustrated in FIG. 19, as another embodiment. The same reference numerals are used in FIG. 19 to identify the same components as those in the first to eighth embodiments described above and a description of such components is omitted herein.

In the configuration illustrated in FIG. 19, the PGA 104 and the AD conversion circuit 105 of only one line are used in time division. In the configuration in FIG. 19, the system control unit 117 drives the FD 103, the PGA 104, and the AD conversion circuit 105 using one of the settings of the High gain and the Low gain as first driving control. Then, the system control unit 117 drives the FD 103, the PGA 104, and the AD conversion circuit 105 using the setting that is not used in the first driving control, among the settings of the High gain and the Low gain, as second driving control. With this configuration, the High gain image and the Low gain image are acquired also in the configuration in FIG. 19.

The functions of the digital processing circuit 107 in each embodiment described above may be realized only by hardware components or may be realized by software components in response to execution of programs by a central processing unit (CPU) or the like. Part of the functions of the digital processing circuit 107 may be performed by the hardware components and the remaining part thereof may be performed by the software components. The programs for the software components may be prepared in advance, may be acquired from a recording medium (not illustrated), such as an external memory, or may be acquired over a network or the like (not illustrated).

Although a digital camera is assumed as an example of the imaging apparatus in the embodiments described above, the imaging apparatus is applicable to various devices capable of shooting of images, such as a smart phone, a tablet terminal, a monitoring camera, an industrial camera, an in-vehicle camera, and a medical camera.

The embodiments described above are only specific examples embodying the present invention and the technical scope of the present invention is not limited by the embodiments. In other words, the present invention can be realized in various modes without departing from the technical idea of the invention or the main features thereof.

According to the present invention, it is possible to achieve the sufficient effect of improving the S/N ratio.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus that amplifies signal voltage resulting from voltage conversion of signal charge obtained by photoelectric conversion of an optical image of an object and then performs digital conversion to the signal voltage, comprising:
    an amplifier circuit that amplifies the signal voltage using two or more amplification factors to generate at least a high gain signal and a low gain signal;
    a weight determining unit configured to determine weights for the respective signals subjected to the digital conversion after the amplification based on the two or more different amplification factors in the amplifier circuit; and
    a combining unit configured to combine the two or more signals subjected to the digital conversion after the amplification using the weights if the low gain signal is less than a predetermined threshold.

2. The imaging apparatus according to claim 1, comprising:
    an amplification factor determining unit configured to determine the amplification factors corresponding to luminance information about the object for at least one of the two or more amplification factors.

3. The imaging apparatus according to claim 2, wherein the amplifier circuit includes two or more amplifier circuits.

4. The imaging apparatus according to claim 3 comprising:
- a luminance acquiring unit configured to acquire the luminance information from the signal resulting from the amplification and the digital conversion of the signal voltage by one amplifier circuit, among the two or more amplifier circuits, wherein
- the amplification factor determining unit determines the amplification factor corresponding to the luminance information for an amplifier circuit different from the amplifier circuit that amplifies the signal voltage in the signal used for the acquisition of the luminance information.

5. The imaging apparatus according to claim 4, wherein
- the luminance acquiring unit acquires the luminance information from the signal resulting from the amplification and the digital conversion of the signal voltage by the amplifier circuit having a relatively low amplification factor set therefor, among the two or more amplifier circuits, and
- the amplification factor determining unit determines the amplification factor corresponding to the luminance information for the amplifier circuit having a relatively high amplification factor set therefor, among the two or more amplifier circuits.

6. The imaging apparatus according to claim 4, wherein the luminance acquiring unit acquires, as the luminance information, at least either of an average and a standard deviation of luminance of an image by the signal subjected to the digital conversion and a skewness and a kurtosis of the luminance of the image by the signal subjected to the digital conversion.

7. The imaging apparatus according to claim 4, wherein
- the luminance acquiring unit acquires an average and a standard deviation of luminance of an image by the signal subjected to the digital conversion as the luminance information, and
- the amplification factor determining unit determines the amplification factor of the amplifier circuit based on the luminance information and a setting mode in which a luminance range to which priority is given is set.

8. The imaging apparatus according to claim 4, wherein
- the luminance acquiring unit acquires at least either of a skewness and a kurtosis of luminance of an image by the signal subjected to the digital conversion as the luminance information, and
- the amplification factor determining unit determines the amplification factor of the amplifier circuit based on the luminance information and a table having the amplification factor described therein.

9. The imaging apparatus according to claim 4, comprising:
- at least one or more electric charge memories that holds the signal charge, wherein
- the luminance acquiring unit acquires the luminance information based on the signal voltage resulting from the voltage conversion of the signal charge output from the electric charge memory.

10. The imaging apparatus according to claim 4, comprising:
- a storing unit configured to store an image by the signal subjected to the digital conversion in an image memory, wherein
- the luminance acquiring unit acquires a histogram of luminance from the stored image.

11. The imaging apparatus according to claim 10, wherein the amplification factor determining unit determines a portion having a lower frequency in the histogram by a threshold value process and determines the amplification factor based on a result of determination and an evaluation value of an image quality.

12. The imaging apparatus according to claim 11, wherein the amplification factor determining unit, if a plurality of candidate amplification factors is acquired based on a result of determination in the threshold value process, selects the amplification factor to be determined based on the evaluation value of the image quality from the plurality of candidate amplification factors.

13. The imaging apparatus according to claim 11, wherein the amplification factor determining unit acquires an S/N as the evaluation value of the image quality.

14. The imaging apparatus according to claim 10, wherein the amplification factor determining unit determines a portion having a lower frequency in the histogram by a threshold value process, segments the histogram by a luminance based on a result of determination, and determines a degree of importance for each region resulting from the segmentation to determine the amplification factor based on the degree of importance.

15. The imaging apparatus according to claim 14, wherein the amplification factor determining unit acquires a maximum value of the frequency in the histogram or a total number of frequencies in the histogram as the degree of importance.

16. The imaging apparatus according to claim 1, wherein the combining unit performs the combination using the weights determined based on the two or more amplification factors and an amount of read-out noise occurring in the digital conversion of the signal subjected to the photoelectric conversion.

17. A method of controlling an imaging apparatus that amplifies signal voltage resulting from voltage conversion of signal charge obtained by photoelectric conversion of an optical image of an object and then performs digital conversion to the signal voltage, comprising:
- amplifying the signal voltage using two or more amplification factors to generate at least a high gain signal and a low gain signal;
- determining weights for the respective signals subjected to the digital conversion after the amplification based on the two or more amplification factors; and
- combining the two or more signals subjected to the digital conversion after the amplification using the weights if the low gain signal is less than a predetermined threshold.

18. A non-transitory computer-readable storage medium for storing a program causing a computer to perform a method of controlling an imaging apparatus that amplifies signal voltage resulting from voltage conversion of signal charge obtained by photoelectric conversion of an optical image of an object and then performs digital conversion to the signal voltage, the program causing the computer to perform:
- amplifying the signal voltage using two or more amplification factors to generate at least a high gain signal and a low gain signal;
- determining weights for the respective signals subjected to the digital conversion after the amplification based on the two or more amplification factors; and combining the two or more signals subjected to the digital conversion after the amplification using the weights if the low gain signal is less than a predetermined threshold.

* * * * *